United States Patent
Alferdaous Alazem et al.

(10) Patent No.: US 12,246,748 B2
(45) Date of Patent: Mar. 11, 2025

(54) RADAR OBJECT CLASSIFICATION BASED ON RADAR CROSS-SECTION DATA

(71) Applicant: Zoox, Inc., Foster City, CA (US)

(72) Inventors: Badeea Ferdaous Alferdaous Alazem, Redwood City, CA (US); Chuang Wang, Woodside, CA (US)

(73) Assignee: Zoox, Inc., Foster City, CA (US)

( * ) Notice: Subject to any disclaimer, the term of this patent is extended or adjusted under 35 U.S.C. 154(b) by 258 days.

(21) Appl. No.: 17/589,504

(22) Filed: Jan. 31, 2022

(65) Prior Publication Data

US 2023/0242149 A1     Aug. 3, 2023

(51) Int. Cl.
*B60W 60/00*      (2020.01)
*B60W 40/06*      (2012.01)
(Continued)

(52) U.S. Cl.
CPC ........ *B60W 60/0011* (2020.02); *B60W 40/06* (2013.01); *G01S 13/89* (2013.01);
(Continued)

(58) Field of Classification Search
CPC ............ B60W 60/0011; B60W 40/06; B60W 2420/52; B60W 2552/00; B60W 2554/20; G01S 13/89; G01S 13/584; G01S 13/44; G01S 13/862; G01S 2013/462; G01S 2013/9319; G01S 7/412; G01S 13/70; G01S 7/417; G01S 13/865; G01S 13/867; G01S 2013/9318; G01S 2013/93185; G01S 2013/93271; G01S 13/931; G06V 10/764; G06V 20/56
See application file for complete search history.

(56) References Cited

U.S. PATENT DOCUMENTS 9,995,819 B1 *   6/2018    Akhund ................ G01S 7/2922
2007/0024494 A1    2/2007    Dizaji
(Continued)

FOREIGN PATENT DOCUMENTS

KR      20180115034 A     10/2018
KR      102243363 B1 *   4/2021

OTHER PUBLICATIONS

Machine Translation of KR 102243363 B1 (Year: 2021).*
PCT Search Report and Written Opinion mailed May 25, 2023 for PCT Application No. PCT/US23/011954, 13 pages.

*Primary Examiner* — James J Lee
*Assistant Examiner* — Alexander George Matta
(74) *Attorney, Agent, or Firm* — Lee & Hayes, P.C.

(57) ABSTRACT

This disclosure describes techniques for using radar cross-section (RCS) data to classify objects detected by autonomous vehicles within driving environments. In some examples, the variance of the RCS data associated with an object may be evaluated to determine signal interference caused by multipath fading. The variance of the RCS data may be used to classify the object and to determine whether the autonomous vehicle can safely drive over the object. For instance, objects such as manhole covers, storm drains, and expansion joints may provide a significant radar signal, but low RCS variance indicating that they can be driven over by the vehicle. Based on the classification of the object, the autonomous vehicle may determine a trajectory around the object or directly over the object.

20 Claims, 7 Drawing Sheets

(51) Int. Cl.
 *G01S 13/89* (2006.01)
 *G06V 10/764* (2022.01)
 *G06V 20/56* (2022.01)

(52) U.S. Cl.
 CPC ............ *G06V 10/764* (2022.01); *G06V 20/56* (2022.01); *B60W 2420/408* (2024.01); *B60W 2552/00* (2020.02); *B60W 2554/20* (2020.02)

(56) References Cited

U.S. PATENT DOCUMENTS

| | | | | |
|---|---|---|---|---|
| 2013/0335260 | A1* | 12/2013 | Kuehnle | G01S 13/931 342/70 |
| 2016/0084943 | A1* | 3/2016 | Arage | G01S 13/726 342/102 |
| 2016/0223663 | A1* | 8/2016 | Schmalenberg | G01S 17/931 |
| 2018/0329411 | A1* | 11/2018 | Levinson | G01S 17/87 |
| 2019/0317219 | A1 | 10/2019 | Smith | |
| 2020/0124719 | A1 | 4/2020 | Noujeim | |
| 2020/0271756 | A1 | 8/2020 | Novoselsky | |
| 2020/0363501 | A1* | 11/2020 | Lau | G01S 15/931 |
| 2021/0088624 | A1* | 3/2021 | Puglielli | G01S 13/42 |
| 2021/0173043 | A1* | 6/2021 | Lang | G01S 13/723 |

\* cited by examiner

RADAR OBJECT CLASSIFICATION BASED ON RADAR CROSS-SECTION DATA

BACKGROUND

Radar generally measures the distance from a radar device to the surface of an object by transmitting a radio wave and receiving a reflection of the radio wave from the surface of the object, which may be read by a sensor of the radar device. The sensor may generate a signal based at least in part on radio waves incident on the sensor. Radar return signals may be attributable to reflections of objects, but portions of radar signals also may be attributable to noise and/or other interfering signals (e.g., from the radar device itself or from an external source). Within the context of autonomous vehicles, radar systems may be used to detect objects in driving environments, analyze the objects, and/or determine routes for the vehicle to navigate through the environment safely and efficiently. For example, an autonomous vehicle may use radar data to detect and avoid obstacles, such as pedestrians, within a planned driving path. However, in some cases, radar noise and interference may cause errors in the analysis of radar data, such as false-positive object detections. Such radar data analysis errors can present challenges to safely and comfortably traversing through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
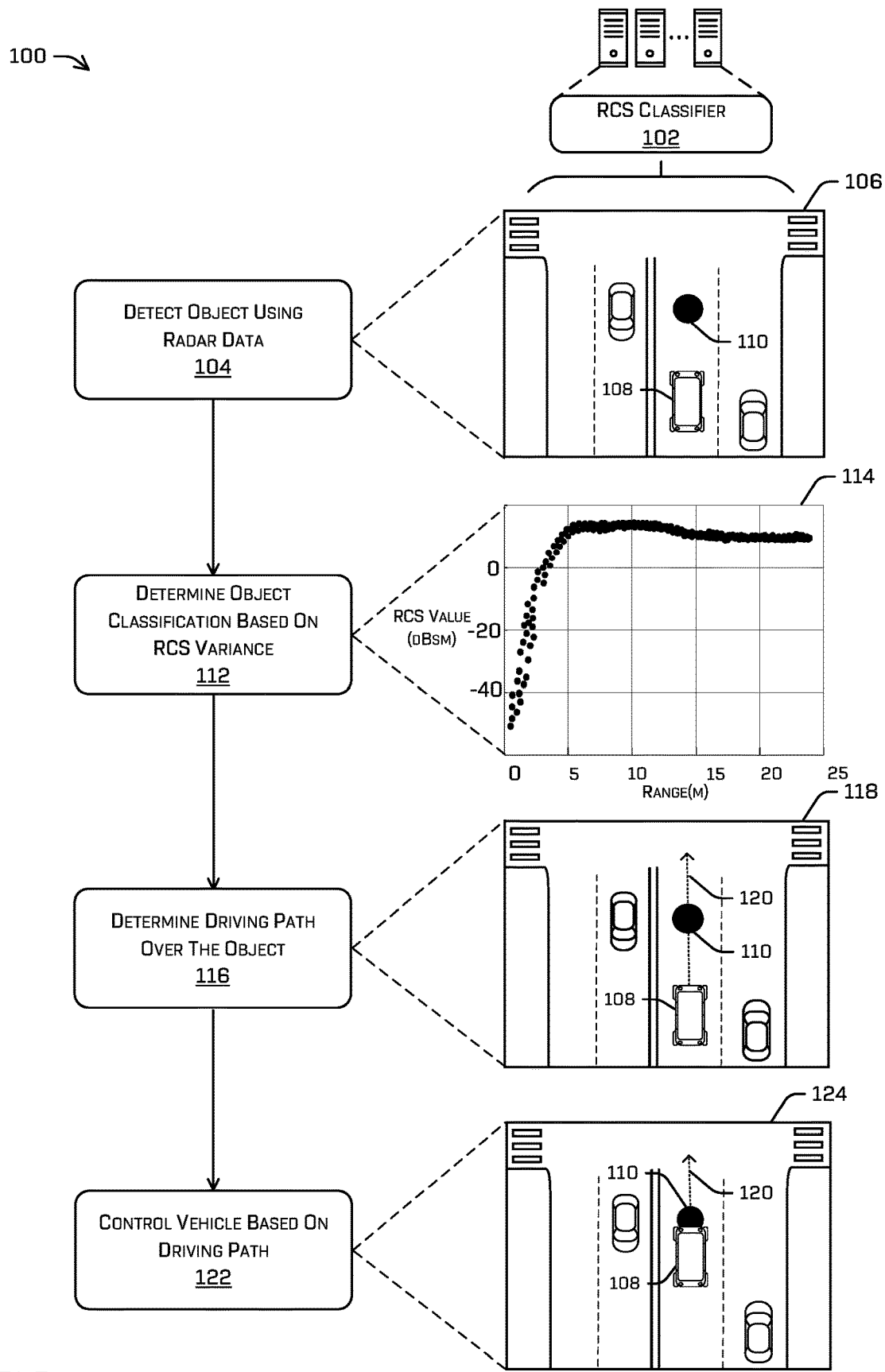
FIG. 1 is a pictorial flow diagram illustrating an example technique for determining a driving path over a road surface feature based on radar data such as the radar cross-section (RCS) variance of the object, in accordance with one or more examples of the disclosure.

This disclosure describes techniques for autonomous vehicles to detect and classify objects within driving environments based on radar cross-section (RCS) data associated with the objects. In some examples, the variance of the RCS data associated with an object may be evaluated to determine signal interference from the object caused by multipath fading. The presence of multipath fading may indicate an object having height, such as a pedestrian, that cannot be safely driven over by the autonomous vehicle. In contrast, the absence of multipath fading may indicate road surface features and/or objects without significant height profiles, such as manhole covers, storm drains, bridge expansion joints, and the like, that can be safely driven over by the vehicle. In various examples, an RCS variance-based object classifier (or RCS classifier) may compare the variance of the RCS data associated with an object to a variance threshold, to determine whether the vehicle can safely drive over the object. Based on the classification of the object, the vehicle may determine a trajectory directly over the object or an alternative trajectory around the object. In various instances, the autonomous vehicle may determine an object classification based on the variance of the RCS radar data using an RCS classifier, and/or based on a combination of the RCS variance data and additional radar data elements (e.g., RCS data, range data, azimuth data, velocity data, etc.) and/or additional sensor data captured by the vehicle (e.g., image data, lidar data, sonar data, etc.). Before classifying an object as a road surface feature with sufficient level of confidence to execute a driving path over the object, the autonomous vehicle may use the RCS variance data in combination with various other sensor-based techniques to determine the object classification and attributes. As described in more detail below, the techniques described herein may improve vehicle safety and driving efficiency by using RCS variance to classify objects more efficiently and accurately while navigating a driving environment.

When an autonomous vehicle is operating within a driving environment, the vehicle may use radar devices to capture radar data of the surrounding environment. The radar data may be analyzed by the autonomous vehicle to detect and classify various objects within the environment. An autonomous vehicle may encounter various types of objects within different driving environments, including dynamic objects that are capable of movement (e.g., vehicles, motorcycles, bicycles, pedestrians, animals, etc.) and/or static objects (e.g., buildings, road surface features, trees, signs, barriers, parked vehicles, etc.). In order to safely traverse a driving environment, an autonomous vehicle may include various components configured to detect objects and classify the objects. In some examples, a perception component of the autonomous vehicle may include various models and/or subcomponents to detect objects based on radar data and/or other sensor data, evaluate the radar data (e.g., radar cross-section data), and classify the objects, etc. For instance, the perception component may analyze radar data to detect an object near the vehicle, and may analyze various components of the radar data (e.g., range, azimuth, RCS, velocity, elevation, etc.) to classify the object. One or more prediction and/or planning components of the autonomous vehicle may use the object detection and classification to determine a driving path for the vehicle relative to the object. In various examples, a perception component may use one or more machine-learning (ML) models and/or heuristics-based components to efficiently detect objects, evaluate sensor data, and/or classify objects while the vehicle is traversing the driving environment.

The perception component may analyze radar data from one or more different radar devices, and/or any number of other sensor types, to detect objects within a driving environment and analyze the attributes of the objects. In some examples, a radar device may generate multiple radar data parameters, including but not limited to radar cross-section (RCS) data, elevation data, azimuth data, velocity data, etc. In other examples, radar devices may be configured to generate additional and/or fewer radar parameters (or data elements).

When analyzing radar data associated with objects within an environment, autonomous vehicles may misclassify certain objects based on the radar data and/or may incorrectly attribute radar signals from road features to non-existent obstacles. In some examples, a radar device may detect a road surface feature (e.g., a manhole cover, storm drain, road expansion joint, steel roadway plate used at a construction area, or road safety feature like a speed bump, raised pavement marker, or rumble strip, etc.), and based on the size, shape, texture, and material of the road surface feature, the radar return signal caused by the feature may resemble the radar return signal of an object having a height that prevents the autonomous vehicle from safely driving over the object. For instance, road surface features such as manhole covers may have a similar azimuth range and magnitude of reflectivity to generate RCS data having a similar to that of a pedestrian. Consequently, if the particular radar device does not provide certain additional radar data elements (e.g., elevation), the perception system may be incapable of accurately determining the height of an object, or distinguishing between certain road surface features and other objects. Thus, for radar devices not providing elevation data (and/or additional sensor data), the perception system may be incapable of determining whether an object has a significant height that would prevent the object from being driven over. For certain road surface features, radar devices may return radar data indicating incorrectly that the road surface feature has a significant height, which may cause the autonomous vehicle to perform a dangerous or inefficient driving maneuver (e.g., emergency stop, alternate route around the object, etc.) when the autonomous vehicle would be capable of safely driving directly over the road surface feature.

To address the technical problems and inefficiencies of incorrectly evaluating radar data and misclassifying objects within an environment, the techniques described herein include using an RCS variance-based classifying system (which also may be referred to as an "RCS variance classifier" or "RCS classifier") to determine signal interference caused by multipath fading. Initially, the RCS classifier may receive radar data captured by radar sensors of an autonomous vehicle traversing within an environment. In some cases, an autonomous vehicle may include multiple radar devices configured to receive radar data of the driving environment. Further, each radar device may provide unique radar data representative of the perspective of the radar device. Additionally, an autonomous vehicle may have various types of radar devices simultaneously capturing different types (or parameters) of radar data, including but not limited to range data, azimuth data, RCS data, velocity data, elevation data, etc.

Based on the radar data, the RCS classifier may detect and classify various objects within the environment. In some examples, the RCS classifier may use automated techniques, such as machine-learned models and/or heuristics-based techniques to automatically detect objects based on the radar data. The RCS classifier may determine an object classification associated with an object by evaluating the variance of the RCS data to determine signal interference caused by multipath fading. Multipath fading occurs when a radar sensor transmits a radio wave and the reflected radio wave returns to the radar sensor from multiple paths. Multipath fading may be more readily observed when a radar device detects an object that has a significant height, as the height of the object provides a greater difference in the length of the multiple return paths back to the radar sensor. RCS data that is illustrative of multipath fading may include a high variability and/or lack of consistency between RCS values. Accordingly, the RCS classifier may determine the presence or absence or multipath fading by evaluating the variance and/or consistency of the RCS data values. In the various examples described herein, the variance and/or consistency of RCS data values may be determined by machine-learning models and/or heuristics-based techniques. In some instances, the RCS classifier may determine an RCS variance and compare the RCS variance to a variance threshold. The variance threshold may be a predefined value associated with the type of radar device and/or the autonomous vehicle model. The RCS variance threshold value may indicate radar return signals where multipath fading may be present. In some examples, when the RCS classifier determines that the variance of the RCS data associated with an object meets or exceeds the variance threshold, then the RCS classifier may determine that radar data indicates the presence of multipath fading. Conversely, if the determined RCS data variance is below the variance threshold, the RCS classifier may determine that the radar data indicates an absence of multipath fading.

Based on the RCS classifier determining the absence of multipath fading associated with the object, the RCS classifier may classify the object as a road surface feature having no or minimal height. For instance, the RCS classifier may determine a low RCS variance and/or lack of multipath fading to determine an object is a road surface feature such as a manhole cover, storm drain, bridge expansion joint, steel roadway plate used at a construction area, speed bump, dip, pot hole, or road safety feature (e.g., raised pavement marker or rumble strip used for lane identification, etc.) that can be safely driven over by the vehicle. Alternatively, if the RCS classifier determines a relatively high RCS variance and/or the presence of multipath fading for an object, the RCS classifier may determine the object classification to be an object with a significant height that cannot be safely driven over by the autonomous vehicle.

In some examples, the RCS classifier, which may be integrated into or otherwise associated with the perception system, may send the object classification to a planning system which may determine a driving path for the autonomous vehicle based on the object classification. Other inputs to the perception system (e.g., image data, lidar data, etc.) may provide additional information about the presence, absence, and/or height of the object. For instance, for an object classified as a road surface feature (and for which other sensor inputs to the perception system are consistent with the object being a road surface feature), the planning system may determine that the object can be safely driven over and may generate a trajectory for the autonomous vehicle directly over the object. Alternatively, if the RCS classifier determines that the object has a significant height (e.g., a pedestrian, traffic sign, road debris, etc.), and/or other sensor inputs of the perception system indicate that the object exists and has a significant height, the planning system may determine that the object is not safe to drive over and generate a trajectory for the autonomous vehicle to stop and/or drive around the object. The trajectories generated by the planning system may be used to control the autonomous vehicle as it navigates about the environment relative to the object.

As illustrated by these examples, the techniques described herein can improve the functioning, safety, and efficiency of autonomous and semi-autonomous vehicles traversing through driving environments by using the variance of RCS data to classify objects more efficiently and accurately. The RCS classifier described herein may improve the vehicle safety and driving efficiency by improving the accuracy of object classification based on the variance of RCS data to determine signal interference caused by multipath fading. The improved classification of objects by the RCS classifier can be used to more efficiently and accurately determine which objects may be safely driven over by a vehicle and which objects may not. The features and functionality described herein thus improve vehicle safety by preventing potential collisions with pedestrians and other objects within the driving environment, while also avoiding dangerous driving maneuvers (e.g., emergency stopping or swerving) caused by false-positive object detections from road surface features that can be safely driven over.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vison systems, such as security systems, object inspection and/or quality assurance systems, environment monitoring systems, etc.

FIG. 1 depicts an example process 100 for classifying an object using the variance of the RCS radar data associated with the object in a driving environment, and determining a driving path over the object based on the object classification. In various examples, some or all of the operations in process 100 may be performed by an RCS classifier component integrated within a perception component, a planning component, and/or other components and systems within an autonomous vehicle. For instance, as shown in this example process 100 may be implemented using an RCS classifier 102 (or RCS variance-based object classifying system). As described below in more detail, the RCS classifier 102 may include various components, such as an RCS variance analyzer and object classifier, which may be configured to receive radar data, and determine and use the variance of RCS data to classify objects detected by the autonomous vehicle while traversing a driving environment.

At operation 104, the RCS classifier 102 may receive radar data collected by one or more radar devices of the autonomous vehicle. The RCS classifier 102 and/or other components within the perception component of the vehicle may detect objects within the environment based on the radar data (and/or additional sensor data). For example, box 106 illustrates an autonomous vehicle 108 navigating a driving environment and approaching an object 110. In this example, the object 110 may be a road surface feature. As shown in box 106, the road surface feature in this example may be a manhole cover. In other examples, the road surface feature may be any object without a significant height profile that can be safely driven over by the vehicle 108, including but not limited to a storm drain, road expansion joint, road safety feature object (e.g., a raised pavement marker or rumble strip), or any other road surface feature or object.

In various examples, the autonomous vehicle 108 may be configured to receive radar data from a single radar device or any number of radar devices configured to capture radar data of a driving environment. Each radar device utilized by the autonomous vehicle 108 may provide unique radar data representative of the perspective of the radar device. In some examples, based on the location of the radar device on the vehicle (e.g., mounted on the left side, right side, front, back, top, etc.) relative to an object in the environment, a first radar device in a first location may generate different radar data than a second radar device in a second location. The first radar device may be closer or farther away from the object compared to the second radar device, and/or may be positioned at a different angle relative to the object, causing different radar data return signals to be received based on the same object.

For any number of radar devices used to capture radar data, each radar device may be of a same or different type (e.g., monastic radar devices, continuous wave radar devices, doppler radar devices, monopulse radar devices, etc.). In some examples, different types of radar devices may collect varying radar data parameters (or elements) (e.g., RCS, elevation, azimuth, velocity, range, etc.). Different radar devices may be configured to collect different combinations of radar data elements, and an autonomous vehicle may include one or a combination of different radar device types to capture different types of radar data.

In operation 104, the radar data collected by the radar device(s) may be used to detect an object within the environment. The RCS classifier 102 may use various automated techniques, such as machine-learned models and/or heuristics-based techniques to automatically detect objects based on the radar data. As shown in box 106, the vehicle 108 may provide captured radar data to the RCS classifier 102 which may utilize automated techniques to detect and/or classify the object 110 within the driving environment.

At operation 112, the RCS classifier 102 may determine an object classification for the object 110 by analyzing the variance of the RCS radar data associated with the object. Box 114 depicts an example in which a number of RCS data values are rendered on a graph. The RCS data may correspond to radar data captured by one or more radar devices of the vehicle 108. RCS data may provide a measurement of the ability of a target object to reflect radar signals back to a radar device, and thus may be indicative of the reflectivity/detectability of an object to radar devices. The radar reflectivity of an object detected within an environment can be based on any number of object attributes, such as the size, shape, and material of the object, and the angles at which the radar beams from the radar device hit the object and are reflected back. When the RCS data values for an object are relatively high, the object is more radar-detectable and/or reflective. Conversely, if RCS data values are low, the object is less radar-detectable and/or reflective.

The RCS classifier 102 may use the RCS data to determine an object classification (and/or object type) for the object 110. To determine the classification for an object, the RCS classifier 102 may evaluate the variance and/or consistency of RCS data values associated with the object, to determine signal interference caused by multipath fading. Based on the presence or absence of multipath fading, and/or the magnitude of multipath fading, the RCS classifier 102 may determine an object classification for the object. Multipath fading may occur when a transmitter of a radar device transmits a radar beam (e.g., a radio wave), and the reflected radar beam returns to the radar device from multiple paths. As such, multipath fading may cause a weakened signal strength and/or significant RCS data fluctuations. Multipath fading frequently occurs when a radar device has detected an object with significant height, as the height of the object provides the radio waves multiple paths back to the radar receiver. RCS data illustrative of multipath fading may include a high variability and/or lack of consistency between RCS values.

Accordingly, the RCS classifier 102 may determine the presence or absence of multipath fading, and/or the magnitude of the multipath fading, by evaluating the variance and/or consistency of the RCS data values. In any of the various examples described herein, the variance and/or consistency of RCS data values may be determined by machine-learning models and/or heuristics-based techniques that may be performed by the RCS classifier 102 based on the variance ranges, derivatives, and/or any other technique for measuring smoothness or roughness of graphs or data plots. Additionally or alternatively, the RCS radar data associated with various objects may be analyzed to determine patterns associated with particular object classifications. For instance, a machine-learning model may be trained based on the RCS radar data associated with various objects detected in an environment, to distinguish road surface features that can be safely driven over from objects having significant height that cannot be driven over. In other examples, RCS data patterns associated with various object classes may be stored as patterns or profile data (e.g., object classification profiles), and may be compared to the RCS radar data received by the radar device(s) of the vehicle, to determine the matching object classes for the objects detected by the vehicle.

After the RCS classifier 102 has determined a variance (e.g., a variance level or metric) of the RCS data associated with the object 110, the variance may be compared to a variance threshold to determine the degree of multipath fading. One or more variance thresholds may be determined as predefined values indicative of one or more thresholds above which it is determined that multipath fading is present. As described below in more detail, the RCS classifier 302 may periodically determine RCS variance metrics as the vehicle approaches the object, using a time-based and/or range-based sliding window of RCS data reflected from the object. In such examples, the subset of RCS data values received within a time window or range window (e.g., excluding any RCS data values received outside of the window) may be used to determine an RCS variance metric associated with the object for the time/range window. The RCS variance metric determined based on the time/range window can be used to determine an object classification for the object. As the vehicle continues to approach the object, the time/range window may slide to cover a subsequent time duration and/or a closer range of RCS data values, and the RCS classifier 302 may determine an updated RCS variance and/or an updated object classification for the object, based on the updated time/range window of RCS data.

In some examples, the RCS variance metric for an object 110 may be represented as a difference between the maximum and minimum RCS values within the RCS data associated with the object 110. In such examples, the variance metric associated with the object 110 (e.g., a maximum RCS value minus minimum RCS value within a sliding window) may be compared to a variance range threshold value. In other examples, the metric representing the RCS variance may be determined by calculating a statistical variance of the distribution of the RCS data. In such examples, the statistical variance metric may be calculated over a sliding window of RCS data (e.g., a N-meter range of RCS values), and the statistical variance metric may be compared to a statistical variance threshold. Accordingly, the variance thresholds described herein may be based on the type of RCS variance metrics determined by the RCS classifier 312 (e.g., RCS max–min metrics versus statistical variances of distributions, etc.). Additionally, in some examples, the RCS classifier 312 may determine a higher or variance thresholds based on situational data, such as the number of radar devices used, the availability of other sensor data (e.g., lidar data, image or video data, sonar data, etc.), the current driving conditions (e.g., ambient light, weather conditions such as rain or fog, road conditions, road gradient such as a road incline or decline, etc.). In various other examples, the RCS variance metric may be determined as a derivative, smoothness or roughness metric determined based on the RCS data plot, etc., and the variance threshold may be a corresponding derivative threshold, smoothness or roughness threshold, etc. The variance threshold may be determined by a human or by automated techniques (e.g., machine learning models, heuristics-based techniques, etc., which may be based on, for example, previously acquired data that has been annotated with the corresponding classification label). In some examples, if the determined RCS variance associated with an object 110 is above the variance threshold, then the degree of RCS variance may indicate the degree of multipath fading, further indicating a significant height of the object 110. Conversely, if the determined RCS variance is below the variance threshold, the RCS data may indicate an absence of multipath fading, further indicating that the object 110 does not have a significant height.

At operation 112, the RCS classifier 102 may determine a classification (or type) for the object 110, by evaluating the variance of the RCS data to determine signal interference caused by multipath fading. As illustrated in box 114, the variance of the RCS data associated with the object 110 is relatively low, throughout the distance range within which the vehicle 108 is receiving a radar signal representing the object 110. The RCS data in box 114 maintains relatively consistent values across all distance ranges as the vehicle 108 navigates closer to the object 110. Accordingly, in this example, the RCS classifier 102 may determine a low variance of the RCS data for the object 110, and compare the variance to the variance threshold to determine that the variance is below the variance threshold. Thus, a significant amount of multipath fading is not present in this example, which indicates that the object 110 has a minimal height profile. As such, the RCS classifier 102 may classify the object 110 as a road surface feature.

In some examples, the RCS classifier 102 may classify the object 110 into one of two broad categories, corresponding to road surface features (e.g., objects with no height or a minimal height profile) that can be safely driven over by the vehicle 108, and non-road surface features (e.g., objects with non-trivial height) that cannot be safely driven over by the vehicle 108. In other examples, the RCS classifier 102 may determine more a specific object classification representing the type of the road surface feature (e.g., manhole cover, storm drain, road expansion joint, road safety feature, pothole, etc.), and/or the type of the none road surface feature (e.g., pedestrian, sign, traffic cone, road debris, etc.). In some cases, different types of road surface features may be determined based on a combination of the RCS variance associated with the road surface feature, the additional radar data elements (e.g., RCS data, range data, azimuth data, velocity data, etc., and/or additional sensor data captured by the vehicle 108 (e.g., image data, lidar data, sonar data, etc.).

At operation 116, the object classification determined by the RCS classifier 102 may be used to determine a driving path for the vehicle 108 over the object 110. In some examples, the RCS classifier 102 may send the object classification of the object 110 to a trajectory planning component within the vehicle 108, which may determine a driving path directly over the object 110, based on the determination that the object is a road surface feature. Box 118 depicts an example in which a planning component has generated a trajectory 120 for vehicle 108 to traverse directly over the object 110. The planning component (or "planner") of the vehicle 108 may be configured to generate one or more trajectories based on an intended destination of the vehicle and the outputs of the perception component of the vehicle 108. As noted above, the perception component may include a number of subcomponents, including but not limited to the RCS classifier 102, configured to detect objects and determine object classifications, locations, sizes, trajectories, etc. The trajectory generated by the planning component may be referred to herein as a planner trajectory. The planner, in conjunction with other components of the autonomous vehicle (e.g., the localization, perception, prediction, and map components) may determine one or more planner trajectories to guide the vehicle to the intended destination. When determining a planner trajectory, the perception system may analyze the captured radar data to detect and identify one or more other objects within the environment in the proximate vicinity of the vehicle. The prediction component may determine predicted trajectories for the dynamic objects, and the planner component may determine a planner trajectory to traverse the environment based on the map data and the desired destination of the vehicle, as well as the classifications, positions, and predicted trajectories of the other objects in the environment. Examples of various techniques for generating planner trajectories for autonomous vehicles can be found, for example, in U.S. Pat. No. 10,921,811, filed on Jan. 22, 2018, issued on Feb. 16, 2021, and titled, "Adaptive Autonomous Vehicle Planner Logic," and U.S. Pat. No. 10,955,851, filed on Feb. 14, 2018, issued on Mar. 23, 2021, and titled, "Detecting Blocking Objects," each of which is incorporated by reference herein in its entirety.

As shown in box 118, in this example, the planner component may generate a trajectory 120 for the vehicle 108 to traverse directly over the object 110. The planner may select the trajectory 120, based on the determination that the object 110 was classified by the RCS classifier 102 as a road surface feature (e.g., an object with no height, or a minimal height, that can safely be driven over by the vehicle 108). As such, the planner may determine that the object 110 may be safely driven over, and may generate the trajectory 120 directly over the object 110.

At operation 122, the planner may control the vehicle 108 using the trajectory 120 to navigate directly over the object 110. Box 124 depicts an example in which the vehicle 108 is shown driving following the trajectory 120 directly over the object 110, which as a road surface feature may be safely driven over. In various examples, the trajectory 120 may be utilized by the planner component, vehicle safety systems, and/or other system controllers of the vehicle 108, to determine the vehicle control commands that may cause the vehicle 108 to track the trajectory 120.

Figure 2:
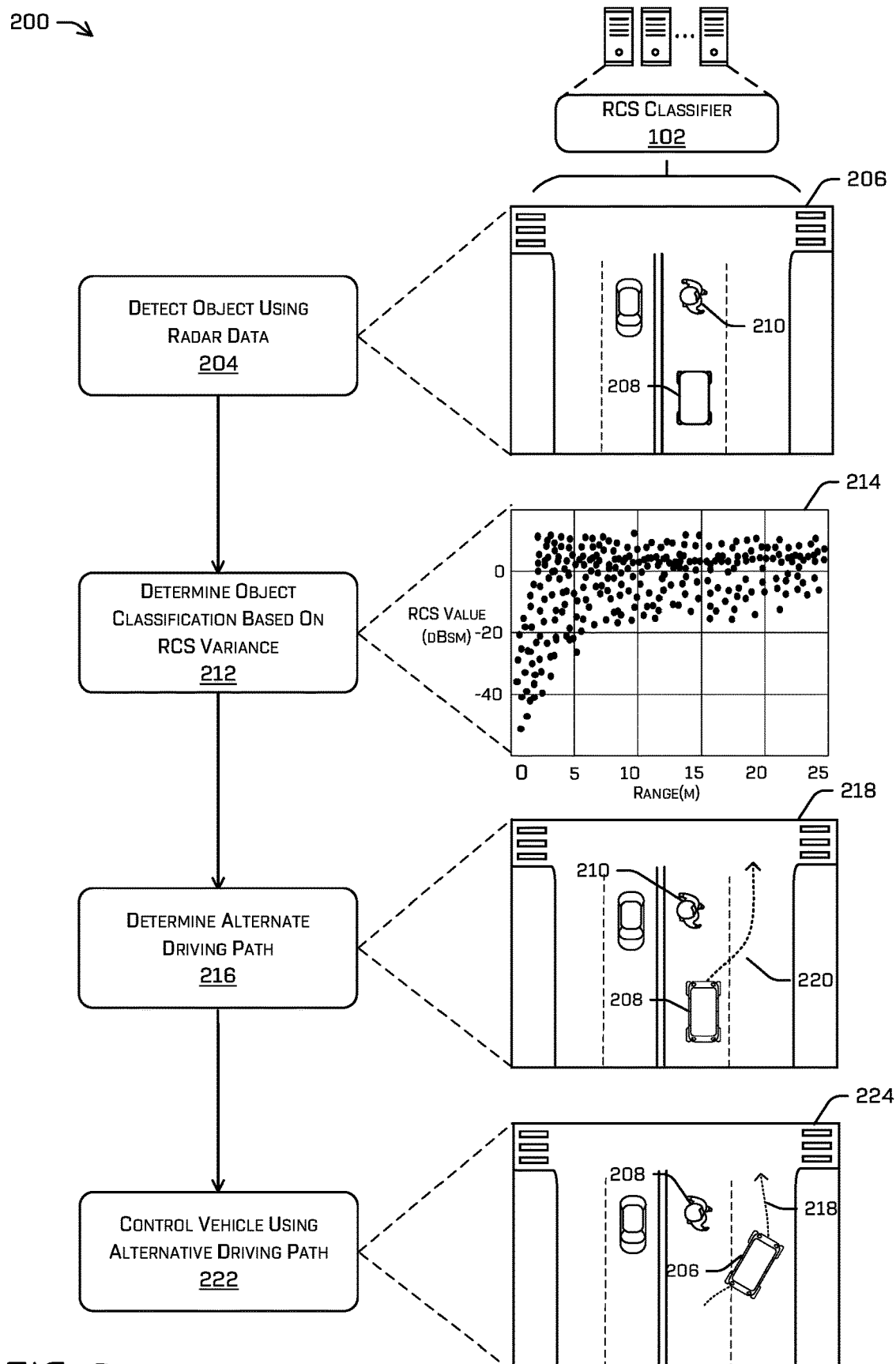
FIG. 2 is another pictorial flow diagram illustrating an example technique for determining a driving path around a non-road surface object based on the radar data RCS variance of the object, in accordance with one or more examples of the disclosure.

FIG. 2 depicts another example process 200 for classifying an object using the variance of the RCS radar data associated with the object in a driving environment, and determining an alternative driving path relative to the object based on the object classification. As in the above example, some or all of the operations in process 200 may be performed by an RCS classifier 102 within a perception component, a planning component, and/or other components and systems within an autonomous vehicle. As noted above, the RCS classifier 102 may include an RCS variance analyzer and object classifier, which may be configured to receive radar data, and determine and use the variance of the RCS data to classify objects detected by the autonomous vehicles while traversing a driving environment.

At operation 204, the RCS classifier 102 may receive radar data collected by the radar device(s) of the autonomous vehicle. As described above, RCS classifier 102 and/or other components within the perception component may detect objects within the environment based on the radar data (and/or additional sensor data). For example, box 206 illustrates an autonomous vehicle 208 navigating a driving environment and approaching a pedestrian 210. Although a pedestrian 210 is shown in this example, in other examples, the vehicle 208 may detect various other static and dynamic objects that cannot be safely driven over, such as other vehicles, motorcycles, bicycles, animals, traffic signs, road debris, etc.

In various examples, the autonomous vehicle 208 may be configured to receive radar data from a single radar device or any number of radar devices on the vehicle configured to capture radar data of the surrounding environment. Each radar device may collect various radar data elements, such as RCS data, range data, azimuth data, velocity data, elevation data, etc. The RCS classifier 102 may receive and analyze the radar data, along with various other sensor data (e.g., image data, lidar data, sonar data, etc.) and/or map data, associated with the vehicle 208 to detect objects within the environment. The RCS classifier 102 may use various automated techniques, as described above, to classify the objects detected based on the RCS variance of the radar data associated with the objects. In box 206, the vehicle 208 may provide various elements of the captured radar data to the RCS classifier 102, associated with any objects detected within the driving environment.

At operation 212, the RCS classifier 102 may determine an object classification for the pedestrian 210 by analyzing the variance of the RCS data associated with the pedestrian 210. Box 214 depicts an example in which a number of RCS data values are rendered on a graph. As described above, the RCS data may represent a measurement of the reflectivity (and/or general radar-detectability) of an object, based on the ability of the object to reflect radar signals back to the radar devices of the vehicle 208. As such, the RCS classifier 102 may determine and use the variance of the RCS data to determine a classification for the pedestrian 210. To determine the classification for the pedestrian 210, the RCS classifier 102 may evaluate the variance and/or consistency of RCS radar data associated with the pedestrian 210, to determine signal interference caused by multipath fading. As described above, the RCS classifier 102 may determine the presence or absence of multipath fading, and/or magnitude of the multiple fading, by evaluating the variance and/or consistency of the RCS data values. The variance and/or consistency of RCS data values may be determined by machine-learning models and/or heuristics-based techniques that may be performed by the RCS classifier 102 based on the variance ranges, derivatives, and/or any other technique for measuring smoothness or roughness of graphs or data plots. For example, after the RCS classifier 102 has determined a variance (e.g., variance metric or level) of the RCS data associated with the pedestrian 210, the variance may be compared to a variance threshold to determine the degree of multipath fading. As noted above, the RCS data variance for an object (e.g., pedestrian 210) may be represented as a range between the maximum and a minimum RCS values within the RCS data associated with the object, and the variance threshold may be a predefined variance range. In other examples, the variance may be represented as a derivative, smoothness or roughness metric determined based on the RCS data plot, etc., and the variance threshold may be a corresponding derivative threshold, smoothness or roughness threshold, etc.

At operation 212, the RCS classifier 102 may determine a classification (or type) for the pedestrian 210, by evaluating the variance of the RCS data to determine signal interference caused by multipath fading. As illustrated in box 214, the variance of the RCS data associated with the pedestrian 210 is relatively high, throughout the distance range within which the vehicle 208 is receiving a radar signal representing the pedestrian 210. In comparison with the RCS data in box 114 associated with object 110 (e.g., a road surface feature object), the RCS data in box 214 fluctuates and has less consistency, both in general and particularly as the vehicle 208 drives closer to the pedestrian 210. Accordingly, in this example, the RCS classifier 102 may determine a high variance of the RCS data for the pedestrian 210, and compare the variance to the variance threshold to determine that the variance meets or exceeds the variance threshold. Thus, a significant amount of multipath fading is present in this example, which indicates that the pedestrian 210 is an object having a significant height. As such, the RCS classifier 102 may classify the pedestrian 210 as a non-road surface object (e.g., an object with height) that cannot be safely driven over by the vehicle 208.

At operation 216, the object classification determined by the RCS classifier 102 may be used to determine an alternative driving path for the vehicle 208 around the pedestrian 210. As noted above, the RCS classifier 102 may send the object classification of the pedestrian 210 to a trajectory planning component within the vehicle 208 system to determine an alternative driving path relative to the pedestrian 210, based on the determination that the object is not a road surface feature and cannot be safely driven over. Box 218 depicts an example in which a planning component has generated a trajectory 220 for vehicle 208 to traverse around the pedestrian 210. As described above, the planning component of the vehicle 208 may be configured to generate any number of alternative trajectories to avoid the pedestrian 210, including stopping trajectories and/or steering trajectories. The alternative trajectories generated by the vehicle 208 may be based on an intended destination of the vehicle, as well as based on the outputs of the perception component of the vehicle 108. As noted above, the perception component may include a number of subcomponents, including but not limited to the RCS classifier 102, configured to detect objects and determine object classifications, locations, sizes, trajectories, etc.

As illustrated in box 218, the planner component may generate a trajectory 220 for the vehicle 208 to traverse around, rather than over, the pedestrian 210. The planner may select the trajectory 120, based on the determination that the pedestrian 210 was classified as a non-road surface feature object having a significant height. As such, the planner may determine that the pedestrian 210 may not be safely driven over by the vehicle 208, and may generate the trajectory 220 around the pedestrian 210. Although in this example, the planner has generated a trajectory around the pedestrian 210, in other examples, the planner may generate various other trajectories to avoid the pedestrian 210 (e.g., stopping trajectories).

At operation 222, the planner may control the vehicle 208 using the trajectory 220 to navigate around the pedestrian 210. Box 224 depicts an example in which the vehicle 208 is shown following the trajectory 220 around the pedestrian 210, based on the determination that the pedestrian is a non-road surface feature that cannot be safely driven over. As noted above, the trajectory 220 may be utilized by the planner component, vehicle safety systems, and/or other system controllers of the vehicle, to determine the vehicle control commands that may cause the vehicle 208 to track the trajectory 220.

Figure 3:
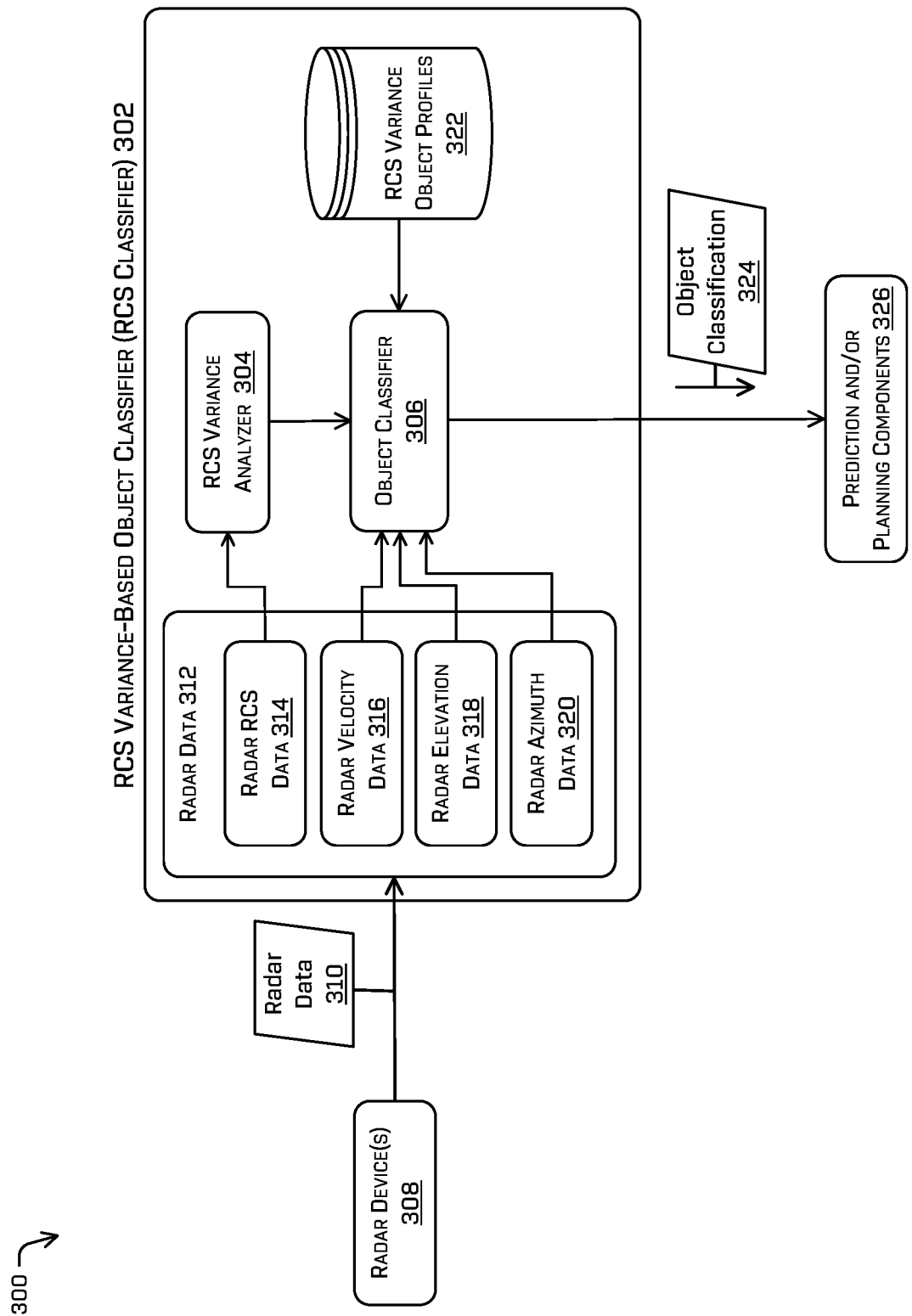
FIG. 3 illustrates an example computing system including an RCS classifier configured to classify objects based on RCS variance data, in accordance with one or more examples of the disclosure.

FIG. 3 shows a block diagram of a computing system 300 including an example RCS variance-based object classifier (or "RCS classifier 302"), configured to evaluate the variance of RCS radar data to classify objects detected by an autonomous vehicle traversing an environment. In some examples, the RCS classifier 302 may be similar or identical to the RCS classifier 102 described above, or in any other examples herein. As noted above, in some cases the RCS classifier 302 may be implemented within or otherwise associated with a perception component of an autonomous vehicle. The RCS classifier 302 may include various subcomponents, described below, configured to perform different functionalities of an RCS variance object classification technique. For example, the RCS classifier 302 may include an RCS variance analyzer 304 configured to determine and evaluate the variance of RCS radar data associated with objects detected in an environment, to determine signal interference by multipath fading. Additionally, the RCS classifier 302 may include an object classifier 306 configured to determine an object classification or type based on the RCS variance and/or other radar data elements. As noted above, the degree of multipath fading may be used to determine whether an object is a road surface feature or has a significant height, and/or to classify the object as an object that the vehicle can or cannot drive over safely.

In some examples, the RCS classifier 302 may receive data from one or more radar device(s) 308 within (or otherwise associated with) an autonomous vehicle. Different radar device(s) 308 may be mounted or installed at different locations on the vehicle, and may include various types of radar devices providing various elements (or parameters) of radar data 310 to the RCS classifier 302. As shown in this example, the RCS classifier 302 may include a radar data component 312 configured to receive, store, and/or synchronize radar data from one or more radar device(s) 308. The radar data component 312 may include various subcomponents, described below, to receive, store, synchronize, and/or analyze particular radar data received from the radar devices 308. A radar device may capture any number of parameters of radar data 310 from any number of radar devices 308. As shown in FIG. 3, the illustrated subcomponents are some of the possible radar data parameters that a radar device may capture. In some examples, a radar device may capture more or less than the illustrated radar data components shown in FIG. 3.

In this example, the radar data component 312 may include an RCS radar data subcomponent 314 configured to store and/or synchronize RCS radar data received from radar devices 308. As noted above, RCS radar data may provide a measure of the reflectiveness and/or detectability of an object to the radar device(s) 308. As noted above, high RCS data values may indicate objects that are more detectable and/or reflective, and low RCS data values may represent objects that are less detectable and/or reflective.

The radar data component 312 may also include one or more additional subcomponents associated with different radar data parameters. As illustrated in FIG. 3, the radar device(s) 308 may capture radar data 310 including velocity radar data, elevation radar data, and azimuth radar data. In some examples, depending on the type of radar device, the radar device may capture additional or fewer radar data parameters. In this example, the radar velocity data component 316 may be used to determine and/or synchronize the velocity of detected objects based on the radar data 310. The radar elevation data component 318 may be used to determine and/or synchronize the height of detected objects based on the radar data 310. The radar azimuth data component 320 may be used to determine and/or synchronize a direction (or bearing) of detected objects relative to the radar device(s) 308.

As noted above, the RCS classifier 302 may include an RCS variance analyzing component (or "RCS variance analyzer 304"), configured to determine and evaluate the variance of the RCS radar data associated with an object classifier 306. In some examples, the RCS variance analyzer 304 may use the variance of the RCS data associated with an object to determine the degree to which the RCS data includes signal interference caused by multipath fading. The RCS variance analyzer 304 may be a subcomponent of the RCS classifier 302 and/or may be implemented within any other component within an autonomous vehicle perception system. In this example, the RCS variance analyzer 304 may receive RCS data from the RCS radar data subcomponent 314 associated with one or more objects. As described below, the RCS variance analyzer 304 may determine a variance level based on RCS data points. Additionally or alternatively, the RCS variance analyzer 304 may calculate derivatives and/or smoothness or roughness metrics based on the RCS data points representing the object. The RCS variance analyzer 304 may include one or more trained machine-learning models and/or heuristics-based techniques to automatically determine the variance of the RCS data, calculate derivatives of the RCS data, and/or determine smoothness or roughness metrics of the RCS data. In at least some examples, a derivative of the RCS with respect to the range may be evaluated on a per point basis. In such examples, a variance may be taken for any number of sliding windows comprising a range of approximately 4 m over the data set. The resultant set of variances over range may then be output by the analyzer 304.

After the RCS variance analyzer 304 has determined a variance (or set of variances) based on the RCS data associated with an object, the RCS variance analyzer 304 may compare the determined RCS variance to one or more variance thresholds. In some examples, one or more variance thresholds may be defined corresponding to different degrees of multipath fading associated with the RCS data for an object in the environment. The variance threshold(s) used by the RCS variance analyzer 304 may be predefined or predetermined values. In this example, the RCS variance analyzer 304 may compare the determined RCS variance determined for an object to a variance threshold. If the determined variance is below the variance threshold, the RCS variance analyzer 304 may determine that the object is a road surface feature and/or has a minimal height profile, and thus the RCS data associated with the object is not indicative of multipath fading. Alternatively, if the determined variance level is above the variance threshold, the RCS variance analyzer 304 may determine that the object has a significant height and is not a road surface feature, and thus the RCS data is indicative of at least some degree of multipath fading. The RCS variance analyzer 304 may send the determinations of the comparisons to the object classifier 306.

The object classifier 306 may be configured to determine an object classification (or type) associated with an object detected in the environment, based on the RCS variance determined by the RCS variance analyzer 304 and/or various additional radar parameters received from the radar data component 312. In some examples, the object classifier 306 may determine an object classification (e.g., road surface feature or non-road surface feature) based solely on the RCS variance of the object received from the RCS variance analyzer 304. Additionally or alternatively, the object classifier 306 may receive and use radar velocity data from the radar velocity data component 316, radar elevation data from the radar elevation data component 318, and/or radar azimuth data from the radar azimuth data component 320, to determine the object classification. In some cases, the object classifier 306 may use the RCS variance data in conjunction with radar-based elevation data, and/or to verify the accuracy of the radar-based elevation data received from radar elevation data component 318. The object classifier 306 may receive additional or fewer radar data parameters depending of the type of radar devices that are used.

In various examples, the object classifier 306 may receive and analyze radar data captured by a single radar device or multiple radar devices 308. For instance, different sets of RCS data may be captured by different radar devices 308 but may be associated with the same object. In such instances, the different sets of RCS data may be individually evaluated to determine different RCS variances, each of which may be compared to a variance threshold. In other examples, the different sets of RCS data from different radar devices 308 may be synchronized (e.g., merged and/or shifted based on range and angle differences), and the RCS variance analyzer 304 may evaluate the synchronized RCS data. The techniques described herein, including determining and evaluating RCS variances based on radar data captured by multiple radar devices 308, and/or evaluating RCS variances in conjunction with additional radar data parameters (e.g., elevation data, velocity data, etc.), may further increase the accuracy of the object classification in some cases.

As noted above, a vehicle may use any number of different object classifiers, each of which may receive any number of different inputs. In some examples, determining an object classification may be based on the variance of the RCS radar data associated with the object, using the various techniques described herein, in conjunction with object classification based on other types of sensor data (e.g., lidar data, image data, sonar data, etc.) and/or map data. For instance, an object classification determined by the object classifier 306 based on RCS variance data from the RCS variance analyzer 304 may be used to verify a separate object classification performed by a separate perception subcomponent, or vice versa, to increase the accuracy and confidence levels associated with the object classification.

In some examples, the RCS classifier 302 may include an RCS variance object profiles repository (or "object profiles data store 322"). The object profiles data store 322 may be a subcomponent of the RCS classifier 302, or may be stored within a separate component within an autonomous vehicle perception system and/or within an external computer system. In some examples, the object profiles data store 322 may store the RCS variance thresholds, and/or one or more RCS data profiles associated with different individual road surface features, individual non-road surface feature objects, and/or combinations of multiple road surface features and/or non-road surface feature objects. The data within the object profiles data store 322 (e.g., RCS variance thresholds and/or RCS data profiles) may be predetermined, and/or may be updated by the object classifier 306 based on the RCS data associated with objects and corresponding classification results.

Using any combination of the techniques described herein, the RCS classifier 302 may determine an object classification for an object in the environment, based on the variance of the RCS data associated with the object (and/or additional data). As shown in this example, the RCS classifier 302 may output object classification(s) 324 may be utilized by one or more predication and/or planning components 326 of the autonomous vehicle. For example, a downstream object prediction system, trajectory planning system, vehicle safety system, etc., may use the object classification 324 to determine driving maneuvers to be performed by the autonomous vehicle. Such driving maneuvers may include following a trajectory relative to the object, such as a trajectory including driving over a road surface feature object, or a trajectory stopping before or driving around a non-road surface feature object.

FIGS. 4A-4D depict four example graphs illustrating various sets of RCS data that may be used to determine signal interference caused by multipath fading, and to classify the associated objects based on the degree of the multipath fading within the RCS data. Three different graphs of RCS data are depicted in FIGS. 4A-4D. In these examples, the RCS data depicted in FIGS. 4A-4D may be similar or identical to the RCS data as shown in FIG. 1 and FIG. 2.

As noted above, an autonomous vehicle may use radar devices to capture radar data of the environment around the vehicle. The radar data, along with additional sensor data and/or map data, may be analyzed by the autonomous vehicle to detect and classify various objects within the environment. Such objects may include dynamic objects that are capable of movement (e.g., vehicles, motorcycles, bicycles, pedestrians, animals, etc.) and/or static objects (e.g., buildings, road features, trees, signs, barriers, etc.). In order to safely traverse driving environments, an autonomous vehicle may include various components configured to detect objects and classify the detected objects. As described above, the RCS classifier 302 may be configured to classify an object, for example, as a road surface feature or a non-road surface feature, and/or as a more specific object type based on RCS radar data. In various examples, the RCS classifier 302 may use patterns of RCS radar data (e.g., object profiles) associated with object types, and/or RCS data variances and variance thresholds, to determine particular object classifications. For instance, the RCS classifier 302 may determine and evaluate the variance of the RCS data associated with an object to determine signal interference caused by multipath fading. Based on the degree of the multipath fading, the RCS classifier 302 may determine an object classification for the object.

Figure 4A:
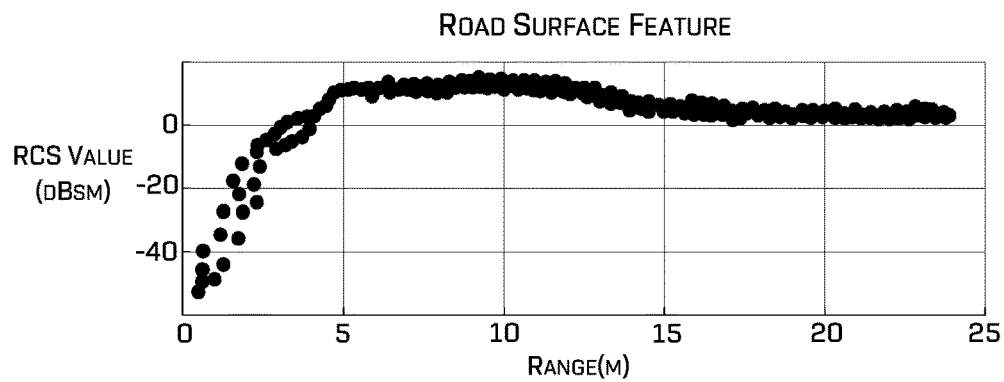
FIGS. 4A-4C depict three example radar data graphs showing RCS data associated with three different objects and/or combinations of objects within a driving environment, in accordance with one or more examples of the disclosure.

FIG. 4A shows a first graph 400A depicting a first example set of RCS data. As shown in this example, the first graph 400A may represent the RCS radar data associated with a road surface feature detected by a radar device of an autonomous vehicle. The graph 400A may include data points representing RCS data values of radar beams reflected by a road surface feature and received by a radar device 308. In graph 400A, the RCS data is displayed in a graph format, with the X-axis representing the distance (range), in meters, of the vehicle from the detected object. The Y-axis in graph 400A may represent the magnitude of energy reflected from the road surface feature object, which may be represented in decibels per square meter (or "dBsm").

In some cases, to determine a variance for the RCS radar data associated with an object, the RCS classifier 302 may determine a difference between the maximum and minimum RCS values within the distance range. For example, the RCS classifier 302 may determine a sliding window across the range of RCS data and may determine the variance (e.g., using the equation variance(diff(RCS))) on the RCS values within each window. In some examples, the RCS classifier 302 may determine variances for only a portion of the range of RCS values. For instance, it may be observed that for distances closer than a distance threshold (e.g., 10-15 meters), the RCS data may be relatively poor at discriminating between road surface features and objects with height. In such instances, the RCS classifier 302 may determine and use the variances of the RCS data for sliding range windows only for farther distances (e.g., greater than 13 meters).

In the example shown in FIG. 4A, using a predetermined range of, the RCS classifier 302 may analyze the RCS values between the range of 15-20 meters and determine an approximate magnitude difference of +5 dBsm determine the high RCS value and the low RCS value. The RCS classifier 302 may repeat this process for the remaining ranges of RCS data in graph 400A. In various examples, the RCS classifier 302 may determine individual RCS variances for different distance ranges (e.g., 0-5 meters, 5-10 meters, 10-15 meters, etc.), and may average the individual RCS variances to determine an overall RCS variance value associated with the object. Although 5-meter distance ranges are shown in this example for simplicity, any size distance range may be used to determine RSC variances in other examples. Additionally or alternatively, the RCS classifier 302 may determine the RCS variance data using a derivative and/or a smoothness or roughness metric based on the RCS data in graph 400A. The RCS classifier 302 may then compare the determined RCS variance values to predetermined variance threshold(s). In this example, the determined variance level of the RCS data may be less than the variance threshold, indicating that the RCS data shown in graph 400A is not representative of multipath fading. Accordingly, the object that reflected the RCS data in graph 400A may be classified as a road surface feature with no height or a minimal height profile.

Figure 4B:
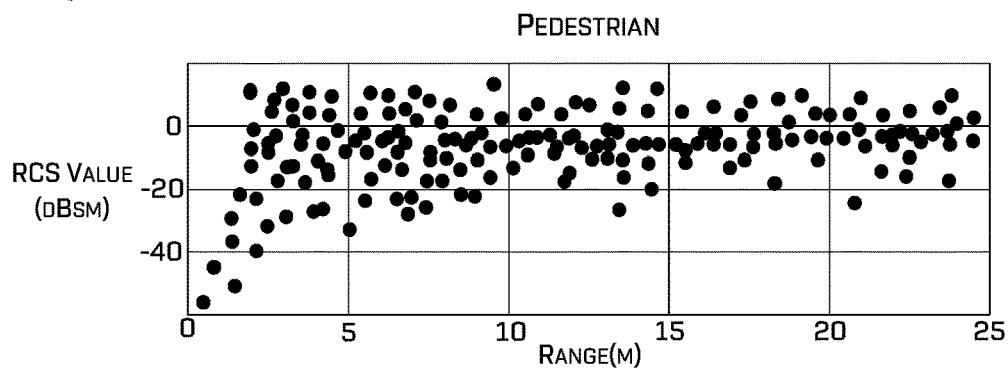

FIG. 4B shows a second graph 400B depicting a second example set of RCS data. As shown in this example, the graph 400B may represent the RCS radar data associated with a pedestrian detected by radar device of an autonomous vehicle. Graph 400B includes a set of data points representing RCS data values of radar beams reflected by a pedestrian and received by a radar device 308. As in the above example, the RCS data shown in graph 400B is displayed in a graph format, with the X-axis representing the distance (or range) in meters of the vehicle from the detected object, and the Y-axis representing the magnitude of energy reflected from the pedestrian object, which may be represented in dBsm. As described above, the RCS classifier 302 may determine and evaluate the variance of the RCS data to determine signal interference caused by multipath fading. In this example, the RCS classifier 302 may determine the high and low RCS values within particular distance ranges, to determine variances for the RCS data associated with the pedestrian. Additionally or alternatively, the RCS classifier 302 may determine the RCS variance data using a derivative and/or a smoothness or roughness metric based on the RCS data in graph 400B. The RCS classifier 302 may then compare the determined RCS variance values to predetermined variance threshold(s). In this example, the determined variance level of the RCS data may be greater than the variance threshold, indicating that the RCS data shown in graph 400B is indicative of multipath fading. Accordingly, the object that reflected the RCS data in graph 400B may be classified as a non-road surface feature (e.g., a pedestrian) with a significant (or non-trivial) height profile.

As described in the above examples, when the RCS classifier 302 determines that an object has a relatively low RCS data variance (e.g., indicating a lack of multipath fading), then the RCS classifier 302 may classify the object as a road surface feature or minimal height object that can be safely driven over by the vehicle. In contrast, when the RCS classifier 302 determines that an object has a relatively high RCS data variance (e.g., indicating the presence of multipath fading), then the RCS classifier 302 may classify the object as a non-road surface feature object having a significant height that cannot be safely driven over by the vehicle. However, in some instances, a driving environment may include a non-road surface object having a significant height (e.g., a pedestrian) on top of or proximate to a road surface feature (e.g., a manhole cover). In these instances, the RCS data received from the road surface feature and the non-road surface object may be combined into the same radar return signal, having the same range and azimuth relative to the vehicle. As shown in the example below, a set of RCS data based on a road surface feature and a separate non-road surface object at or near the same location may be observed to have an RCS variance between the variances observed for road surface features only (e.g., low RCS variances) and the variances observed for non-road surface objects (e.g., high RCS variances). Accordingly, detecting RCS data having a variance within a middle range of RCS variances may cause the RCS classifier 302 to determine that the objects associated with the RCS data include both a road surface feature and a separate non-road surface object at or near the same location.

Figure 4C:
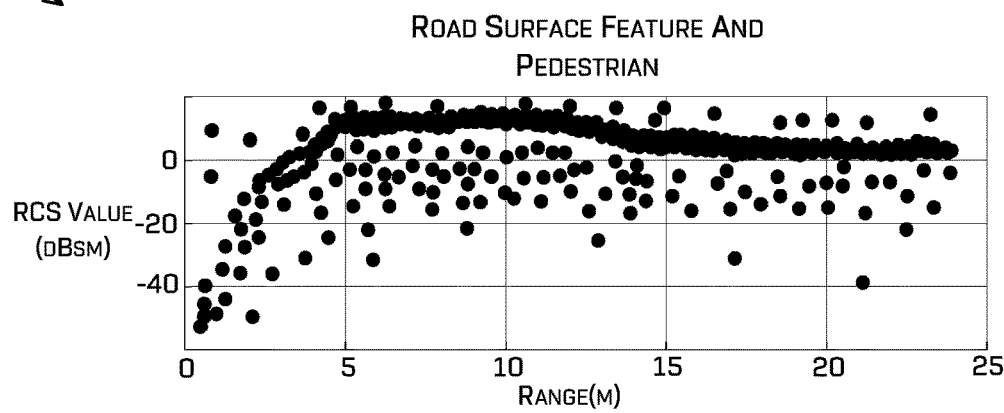

FIG. 4C shows a third graph 400C depicting a third example set of RCS data. As shown in this example, graph 400C may represent the RCS radar data based on a combination of two objects: a road surface feature (e.g., a manhole cover) and a pedestrian at the same location or near each other in the driving environment. As in the above example, the RCS data shown in graph 400C is displayed in a graph format, with the X-axis representing the distance (or range) in meters of the vehicle from the detected objects, and the Y-axis representing the magnitude of energy reflected from the objects, which may be represented in dBsm. As described above, the RCS classifier 302 may determine and evaluate the variance of the RCS data to determine signal interference caused by multipath fading. In this example, the RCS classifier 302 may determine the high and low RCS values within particular distance ranges in graph 400C, to determine variances for the RCS data associated with the combination of objects. The RCS classifier 302 then may compare the determined RCS variances to predetermined variance threshold(s). In this example, the determined variance of the RCS data in graph 400C may meet or exceed a first variance threshold (e.g., a threshold associated with a road surface feature classification), but may be less than a second variance threshold (e.g., a threshold associated with a non-road surface feature object classification). Accordingly, the RCS classifier 302 may classify the RCS data in graph 400C as indictive of a combination of multiple objects, including a road surface feature (e.g., manhole cover) having a minimal height profile and a non-road surface feature object (e.g., a pedestrian) having a significant height profile.

Figure 4D:
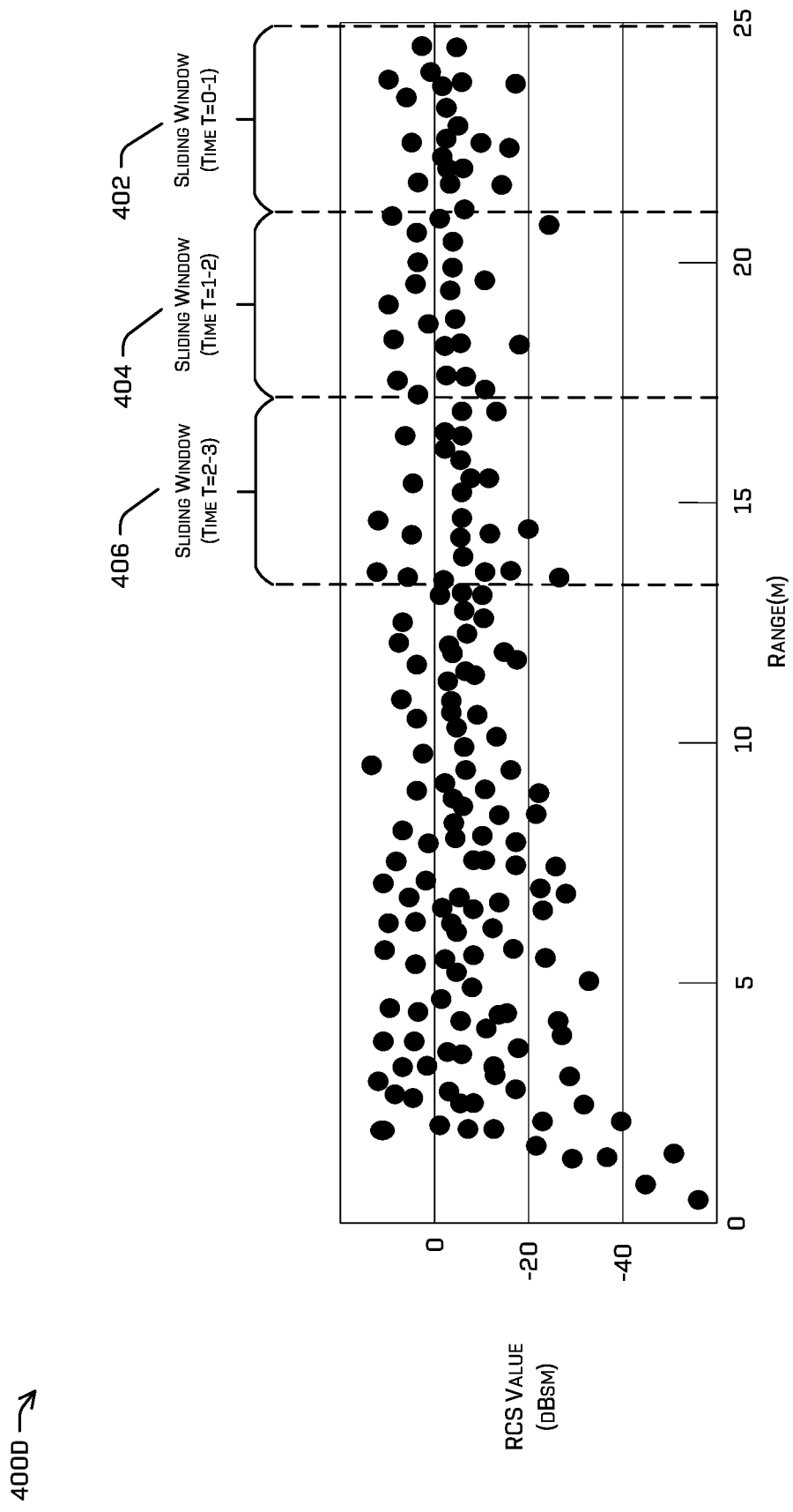
FIG. 4D depicts another example radar data graph showing RCS data associated with an object in a driving environment, including a number of sliding windows for determining RCS variance within different time and/or range windows, in accordance with one or more examples of the disclosure.

FIG. 4D shows a fourth graph 400D depicting another example set of RCS data. The RCS data shown in this example may be similar or identical to the RCS data shown in graph 400B, represent RCS data associated with a pedestrian detected by radar device of an approaching vehicle. As noted above, the RCS classifier 302 may repeated (e.g., periodically or continuously) determine RCS variance metrics associated with an object as the vehicle approaches the object. As shown in this example, the RCS classifier 302 may determine sliding time windows and/or sliding range windows of RCS data for the object as the vehicle approaches the object, and may use the sliding time/range windows to determine updated RCS variance metrics for the object.

In this example, as the vehicle approaches the object, at an initial time T0 (e.g., t=0 secs), the vehicle is at a range of approximately 25 meters from the object. When the vehicle reaches a subsequent time T1 (e.g., t=1 secs), the vehicle is at a range of approximately 21 meters from the object. At or around time T1, the vehicle may determine a first sliding window 402 of RCS data, including any RCS data values received by the radar device(s) of the vehicle between times T0 and T1, corresponding to a range of 21-25 meters from the object. The RCS classifier 302 may use the RCS data defined by the first sliding window 402 to determine a first RCS variance metric for the object, and to classify the object based on the first RCS variance metric. As the vehicle continues to approach the object, at subsequent time T2 (e.g., t=2 secs), the vehicle may be at a range of approximately 17 meters from the object. At or around time T2, the vehicle may determine a second sliding window 404 of RCS data, including any RCS data values received by the radar device(s) of the vehicle between times T1 and T2, corresponding to a range of approximate 17-21 meters from the object. The RCS classifier 302 may use the RCS data defined by the second sliding window 404 to determine updated RCS variance metric for the object, and to reclassify the object based on the second RCS variance metric. Similarly, at subsequent time T3 (e.g., t=3 secs), the vehicle may be at a range of approximately 13 meters from the object. At or around time T3, the vehicle may determine a third sliding window 406 of RCS data, including any RCS data values received by the radar device(s) of the vehicle between times T2 and T3, corresponding to a range of approximate 13-17 meters from the object. The RCS classifier 302 may use the RCS data defined by the third sliding window 406 to determine updated RCS variance metric for the object, and to reclassify the object based on the second RCS variance metric.

As shown in this examples, the sliding windows of RCS data used by the RCS classifier 302 may be defined based on time (e.g., increasing as the vehicle approaches the object) and/or based on range (e.g., decreasing as the vehicle approaches the object). Additionally, although the sliding windows 402-406 are shown as non-overlapping in this example for clarity, it is to be understood that the RCS classifier 302 may determine any number of overlapping RCS data windows as the vehicle approaches an object. For instance, the RCS classifier 302 may determine an updated RCS data window at periodic distance thresholds (e.g., every 0.1 meters, . . . , 0.5 meters, 1 meter, etc.), or at periodic distance thresholds (e.g., every 0.1 secs, . . . , 0.5 secs, 1 sec, etc.).

As the vehicle approaches an object, the RCS classifier 302 may determine any number of RCS variance metrics for object based on the different sliding RCS data windows, and may determine an object classification based on each RCS variance metric. In some cases, the RCS classifier 302 may determine initial object classification (e.g., a road surface object) for the object based on a first sliding window of RCS data, and then determine an updated object classification (e.g., a pedestrian) for the object based on a second sliding window of RCS data as the vehicle approaches the object. In such examples, when the RCS classifier 302 reclassifies the object as a non-road surface feature object, the vehicle may determine an updated driving path (e.g., an alternative driving to avoid the object), or vice versa.

In some instances, the RCS classifier 302 may use different sizes of sliding RCS data windows and/or may dynamically adjust up or down the size of the sliding RCS data windows used to determine RCS variance metrics for approaching objects. As an example, when the vehicle is moving faster and/or approaching the object more quickly the RCS classifier 302 may use a smaller sized sliding RCS data window, so that the RCS variance metric and object classification can be performed more quickly. In other examples, the size of the sliding RCS data windows used by the RCS classifier 302 may be adjusted up or down based on the number of radar devices used, the availability of other sensor data (e.g., lidar data, image or video data, sonar data, etc.), the current driving conditions (e.g., ambient light, weather conditions such as rain or fog, road conditions, road gradient such as an incline/decline, etc.).

As described in the above examples, the RCS classifier 302 may determine object classifications based on the variance in the RCS data associated with objects detected in the environment. For instance, the RCS classifier 302 may determine RCS variance values from the RCS radar data reflected by an object (or objects), and compare the RCS variance values to any number of variances threshold to determine the object classification. The RCS variance metrics associated with an object may include an RCS delta (e.g., the maximum observed RCS value minus the minimum observed RCS value) for the object over a time duration and/or range window of RCS data associated with the object. Additionally or alternatively, the RCS variance metrics may include a statistical variance calculation of the distribution of the RCS data within the particular time duration and/or range window. In still other examples, the RCS classifier 302 may generate a curve based on the RCS data points and derivate the curve at one or more locations to determine RCS derivative values associated with the object. In such examples, the RCS derivative values may be compared to RCS derivative thresholds to determine an object classification(s) for the object. In still other examples, the RCS classifier 302 may analyze the RCS data points reflected from the object(s) to determine metrics corresponding to the smoothness or roughness of the RCS data. The RCS data smoothness or roughness metrics can be compared to thresholds to determine object classifications for the object. In other cases, the RCS classifier 302 may use one or more trained ML models instead of in addition to threshold values, to classify the RCS data associated with an object. For instance, RCS data associated with an object region in the environment may be provided as input an ML model trained to classify the RCS data into one of a predetermined number of RCS data patterns. Each RCS data pattern may be associated with one or more object classifications or types, and the output of the ML model may be used to classify the object (or objects).

Figure 5:
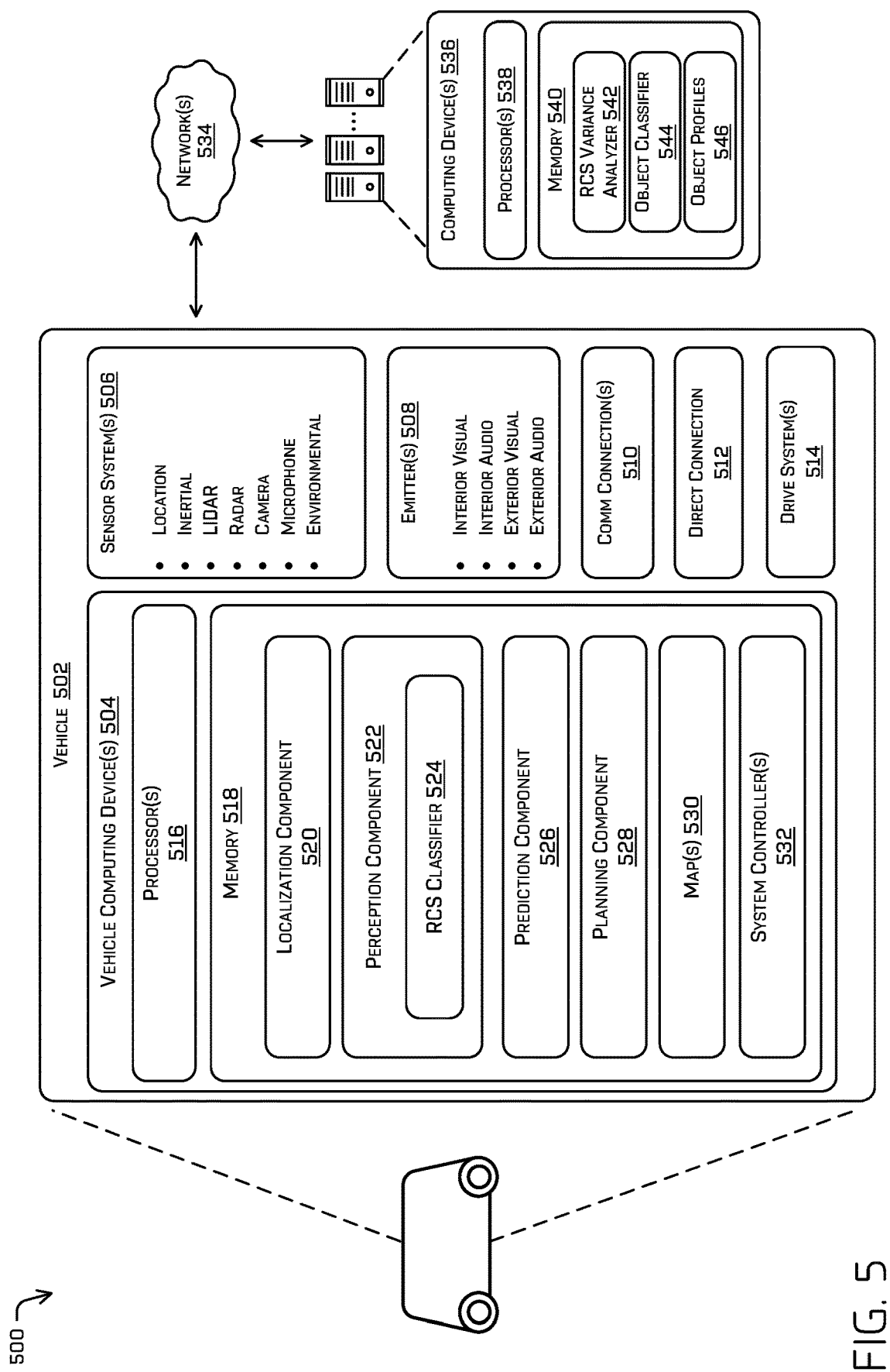
FIG. 5 depicts a block diagram of an example system for implementing various techniques described herein.

FIG. 5 depicts a block diagram of an example system 500 for implementing various techniques described herein. The system 500 can include a vehicle 502, which can correspond to an autonomous or semi-autonomous vehicle configured to perform various techniques described herein for classifying objects detected within the driving environment based on the variance of the RCS data associated with the objects. In this example, the vehicle 502 may include components configured to detect an object using radar data and/or additional sensor data, classify the object based on the variance of the RCS data associated with the object, and determine a driving path for the vehicle based on the object classification. The vehicle 502 in this example may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may or may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 may include one or more vehicle computing device(s) 504, one or more sensor systems 506, one or more emitters 508, one or more communication connections 510, at least one direct connection 512, and one or more drive systems 514.

The vehicle computing device(s) 504 can include one or more processors 516 and memory 518 communicatively coupled with the one or more processors 516. In the illustrated example, the vehicle 502 is an autonomous vehicle; however, the vehicle 502 could be any other type of vehicle or robotic platform. In the illustrated example, the memory 518 of the vehicle computing device(s) 504 stores a localization component 520, a perception component 522 including one or more RCS classifiers 524, a prediction component 526, a planning component 528, one or more maps 530, one or more system controllers 532. Although the perception component 522 is depicted in this example storing the RCS classifier(s) 524, in other examples one or more RCS classifier(s) 524 may be stored within any other components of the vehicle 502. Additionally although depicted in FIG. 5 as residing in the memory 518 for illustrative purposes, one or more of the localization component 520, perception component 522, prediction component 526, planning component 528, maps 530, and/or system controllers 532 can additionally, or alternatively, be accessible to the vehicle 502 (e.g., stored on, or otherwise accessible by, memory remote from the vehicle 502).

The vehicle computing device(s) 504 may generally perform processing to control how the vehicle maneuvers within an environment. The vehicle computing device(s) 504 may implement various artificial intelligence (AI) techniques, such as machine learning, to analyze and understand the environment around the vehicle 502 and/or instruct the vehicle 502 to move within the environment. The various components of the vehicle computing device(s) 504, such as the localization component 520, perception component 522, prediction component 526, and/or planning component 528 may implement various AI techniques to localize the vehicle, detect objects around the vehicle, segment sensor data, determine classifications of the objects, predict object tracks, generate trajectories for the vehicle 502 and the objects around the vehicle, and so on. In some examples, the vehicle computing device(s) 504 may process data from multiple types of sensors on the vehicle, such as light detection and ranging (lidar) sensors, radar sensors, image sensors, depth sensors (time of flight, structured light, etc.), cameras, and the like, within the sensor systems 506.

Although depicted in FIG. 5 as residing in the memory 518 for illustrative purposes, it is contemplated that the localization component 520, the perception component 522, the prediction component 526, the planning component 528, the maps 530, and/or the system controllers 532 may additionally, or alternatively, be accessible to the vehicle 502 (e.g., stored on, or otherwise accessible by, memory remote from the vehicle 502, such as, for example, on memory 540 of a remote computing device 536).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position and/or trajectory of the vehicle 502, as discussed herein.

In some instances, and in general, the perception component 522 can include functionality to perform object detection, segmentation, and/or classification. In some examples, the perception component 522 can provide processed sensor data that indicates a presence of an object that is proximate to the vehicle 502 and/or a classification of the object as an object type (e.g., car, pedestrian, cyclist, animal, building, tree, road surface, curb, sidewalk, stoplight, stop sign, unknown, etc.). In additional or alternative examples, the perception component 522 can provide processed sensor data that indicates one or more characteristics associated with a detected object or entity (e.g., a tracked object) and/or the environment in which the entity is positioned. In some examples, characteristics associated with an object or entity can include, but are not limited to, an x-position (global and/or local position), a y-position (global and/or local position), a z-position (global and/or local position), an orientation (e.g., a roll, pitch, yaw), an object or entity type (e.g., a classification), a velocity of the entity, an acceleration of the entity, an extent of the entity (size), etc. Characteristics associated with the environment can include, but are not limited to, the presence of other objects or entities in the environment, the state of the objects or entities in the environment, a time of day, a day of a week, a season, a weather condition, an indication of darkness/light, etc.

The RCS classifier(s) 524, which may be implemented within the perception component 522, may include any of the components described herein configured to perform one or more object detection and/or classification functionalities. In some examples, the RCS classifier(s) 524 may be similar or identical to the RCS classifier 302 described above. For example, RCS classifier(s) 524 may include one or more of an RCS variance analyzer 304, an object classifier 306, and/or object profiles data store 322. These components may be used in combination to analyze the received radar data associated with an object, determine the variance of the RCS data associated with the object, and classify the object as an object as a road surface feature or a non-road surface feature object. In some examples, the RCS classifier(s) 524 may include trained ML models and/or additional components configured to classify objects using RCS data patterns. After determining an object classification, based in whole or in part on the RCS classifier(s) 524 (e.g., using RCS variance data), the perception component 522 may send the object classification to the planning component 528 which may generate vehicle trajectories based on the object classification.

In general, the prediction component 526 can include functionality to generate predicted information associated with objects in an environment. As an example, the prediction component 526 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 502 traverses an environment. In some examples, the prediction component 526 can generate one or more predicted positions, predicted velocities, predicted trajectories, etc., for such target objects based on attributes of the target object and/or other objects proximate the target object.

In general, the planning component 528 can determine a path for the vehicle 502 to follow to traverse the environment. The planning component 528 can include functionality to determine various routes and trajectories and various levels of detail. For example, the planning component 528 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate. In some instances, the planning component 528 can generate one or more trajectories for the vehicle 502 based at least in part on predicted location(s) associated with object(s) in an environment. In some examples, the planning component 528 can use temporal logic, such as linear temporal logic and/or signal temporal logic, to evaluate one or more trajectories of the vehicle 502.

In at least one example, the vehicle computing device(s) 504 can include one or more system controllers 532, which can be configured to control steering, propulsion, braking, safety, emitters, communication, and other systems of the vehicle 502. These system controller(s) 532 can communicate with and/or control corresponding systems of the drive system(s) 514 and/or other components of the vehicle 502. For example, the planning component 528 may generate instructions based at least in part on perception data generated by the perception component 522 and transmit the instructions to the system controller(s) 532, which may control operation of the vehicle 502 based at least in part on the instructions. In some examples, if the planning component 528 receives a notification that a track of an object was "lost" (e.g., an object no longer appears in perception data and isn't occluded by any other objects), the planning component 528 may generate an instruction to bring the vehicle 502 to a safe stop and/or to transmit a request for teleoperator assistance.

The memory 518 can further include one or more maps 530 that can be used by the vehicle 502 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., vectorized information regarding features of an environment, image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 530 can include at least one map (e.g., images and/or a mesh).

In some examples, the vehicle 502 can be controlled based at least in part on the maps 530. That is, the maps 530 can be used in connection with the localization component 520, the perception component 522, the prediction component 526, and/or the planning component 528 to determine a location of the vehicle 502, identify objects in an environment, and/or generate routes and/or trajectories to navigate within an environment. In some examples, the one or more maps 530 can be stored on a remote computing device(s), such as within the memory 540 of the computing device(s) 536, and may be accessible to the vehicle 502 via network(s) 534. In some examples, multiple maps 530 can be retrieved from the memory 540, and stored based on, for example, a characteristic (e.g., type of entity, time of day, day of week, season of the year, etc.). Storing multiple maps 530 can have similar memory requirements, but can increase the speed at which data in a map can be accessed.

As can be understood, the components discussed herein (e.g., the localization component 520, the perception component 522, the prediction component 526, the planning component 528, the maps 530, and/or system controllers 532) are described as divided for illustrative purposes. However, the operations performed by the various components can be combined or performed in any other component. Further, any of the components discussed as being implemented in software can be implemented in hardware, and vice versa. Further, any functionality implemented in the vehicle 502 can be implemented in remote computing device(s) 536 and/or or other components (and vice versa).

In at least one example, the sensor system(s) 506 can include time of flight sensors, lidar sensors, radar devices and/or radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the time of flight sensors can include individual time of flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504. Additionally or alternatively, the sensor system(s) 506 can send sensor data, via the one or more networks 534, to the one or more computing device(s) 536 at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 534. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. The vehicle 502 can have a single drive system 514, or multiple drive systems 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the localization component 520, the perception component 522, the prediction component 526, the planning component 528, the maps 530, and/or the system controllers 532 can process sensor data, as described above, and can send their respective outputs, over the one or more network(s) 534, to one or more computing device(s) 536. In at least one example, the respective outputs of the components can be transmitted to the one or more computing device(s) 536 at a particular frequency, after a lapse of a predetermined period of time, in near real-time, etc. Additionally or alternatively, the vehicle 502 can send driving log data to one or more computing device(s) 536 via the network(s) 534, including raw sensor data, processed sensor data and/or representations of sensor data. Such driving log data (or sensor data) can be sent as one or more log files to the computing device(s) 536 at a particular frequency, after a lapse of a predetermined period of time, in near real-time, etc.

The computing device(s) 536 can include processor(s) 538, a memory 540, and various components that may be received from and/or transmitted to the vehicle 502 and additional autonomous vehicles in a fleet. For example, the memory 540 of the computing device(s) 536 may store one or more RCS variance analyzer(s) 542, object classifier(s) 544, and an object classification profiles 546. The RCS variance analyzer(s) 542, object classifier(s) 544, and object classification profiles 546 may be stored by the computing device(s) 536 and transmitted to different autonomous vehicles based on the characteristics of the different autonomous vehicles. For instance, based on the number, types, and locations of the radar devices on a vehicle 502, the computing device(s) 536 may select and provide particular versions of the RCS variance analyzer(s) 542, object classifier(s) 544, and object classification profiles 546 to the vehicle 502.

The processor(s) 516 of the vehicle 502 and the processor(s) 538 of the computing device(s) 536 can be any suitable processor capable of executing instructions to process data and perform operations as described herein. By way of example and not limitation, the processor(s) 516 and 538 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 540 are examples of non-transitory computer-readable media. The memory 518 and 540 can store an operating system and one or more software applications, instructions, programs, and/or data to implement the methods described herein and the functions attributed to the various systems. In various examples, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 536 and/or components of the computing device(s) 536 can be associated with the vehicle 502. That is, the vehicle 502 can perform one or more of the functions associated with the computing device(s) 536, and vice versa.

Figure 6:
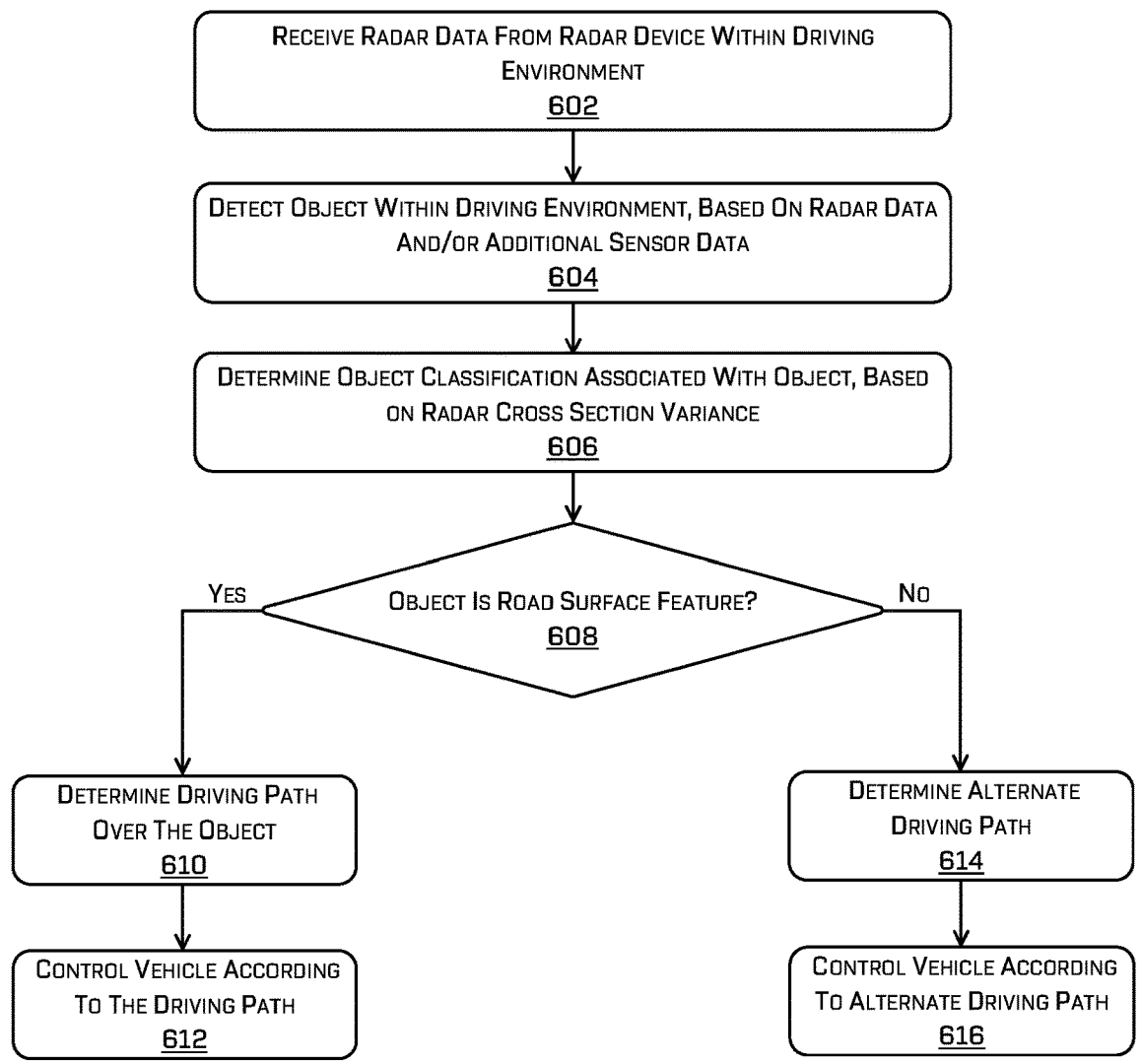
FIG. 6 is a flow diagram illustrating an example process of classifying an object by a vehicle based on RCS data variance, and determining a driving path for a vehicle relative to a detected object based on the object classification, in accordance with one or more examples of the disclosure.

FIG. 6 is a flow diagram depicting an example process 600 for classifying an object based on RCS data variance, and determining a driving path for an autonomous vehicle relative to the object based on the object classification. As described below, process 600 may be performed by one or more computer-based components configured to implement various functionalities described herein. For instance, some or all of the operations of process 600 may be performed by an RCS classifier 302 configured to classify objects within a driving environment by analyzing the variance of RCS data received from one or more radar devices. As described above, an RCS classifier 302 may be integrated as an on-vehicle system in some examples.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the RCS classifier 302 may receive radar data from one or more radar devices of an autonomous vehicle traversing an environment. As described above, an autonomous vehicle may obtain various types of radar data from any number of radar devices. Further, each of the radar devices may be configured to collect a variety of different radar data parameters. For example, some radar devices may capture radar data parameters including RCS data, azimuth data, velocity data, elevation data, etc.

At operation 604, a perception component of the autonomous vehicle may detect an object within the driving environment. In some examples, the perception component may be configured to evaluate the radar data to detect an object. Additionally or alternatively, the perception component may use various other types of sensor data (e.g., lidar data, image data, sonar data, etc.), and/or localization and map data, to determine an object within the driving environment. As described above, the perception component may use various automated techniques, such as machine-learned models and/or heuristics-based techniques to detect objects based on various input data.

At operation 606, the RCS classifier 302 may determine an object classification for the object based on the variance of the RCS data associated with the object. As described above, the RCS classifier 302 may classify the object by evaluating the variance of RCS data associated with the radar data to determine the degree of signal interference caused by multipath fading. Multipath fading within the RCS data may indicate that an object has a significant height. Accordingly, RCS data that is illustrative of multipath fading may include a high variability and/or lack of consistency between RCS values within a particular range window. The RCS classifier 302 may determine the degree of multipath fading by evaluating the variance and/or consistency of the RCS data values. As described above, after the variance of the RCS data associated with an object has been determined, the RCS classifier 302 may compare the variance to one or more variance thresholds. For instance, the RCS classifier 302 may determine a variance within a set of RCS data values, and if the variance is below the variance threshold the RCS classifier 302 may determine that the RCS data may indicate an absence of multipath fading. Conversely, if the determined RCS data variance is above the variance threshold, the RCS classifier 302 may determine that the RCS data may indicate the presence of multipath fading.

After the RCS classifier 302 has determined the degree of multipath fading within the RCS data associated with the object, the RCS classifier 302 may classify the object based on the degree of multipath fading (e.g., the variance of the RCS data). If RCS data associated with an object is shown to have a relatively high amount of interference from multipath fading, the RCS classifier 302 may classify the object as an object with a significant height that cannot be safely driven over by the vehicle. Alternatively, if the RCS data associated with the object is shown to have a relatively low amount of interference from multipath fading, the RCS classifier 302 may classify the object as a road surface feature and/or an object without a significant height profile that can be safely driven over by the vehicle.

At operation 608, a planning component of the autonomous vehicle may determine whether the object has been classified as a road surface feature. As described above, the RCS classifier 302 may determine an object classification based on the RCS data variance associated with the object. After determining the object classification, the RCS classifier 302 may send the object classification to a trajectory planner/driving path determination component (e.g., the planning component 528) of the vehicle, which may determine a trajectory based at least in part on whether the object is a road surface feature. In this example, if the object has been classified as a road surface feature (608:Yes), then the planning system may determine and generate a candidate trajectory directly over the object in operations 610 and 612. For example, at operation 610, the planning component may determine and generate a candidate trajectory directly over the object. As described above, after determining that the object is a road surface feature (e.g., a manhole cover, storm drain, bridge expansion joint, or road safety feature), the planner can determine that the autonomous vehicle may safely drive directly over the object. The planning component may work in conjunction with other components of the autonomous vehicle to determine a candidate trajectory to guide the vehicle to its intended destination. At operation 612, the planning component may control the autonomous vehicle based at least in part on the candidate trajectory determined in operation 610. For example, the planner may engage the system controllers of the autonomous vehicle to execute the trajectory directly over the road surface feature.

In contrast, if the object has been classified as a non-road surface feature (608:No), then the planning system may determine and generate an alternate candidate trajectory. For example, at operation 614, the planning component may determine and generate an alternate candidate trajectory. As described above, based on determining that the object is not a road surface feature, the planner may determine that the autonomous vehicle may not safely drive directly over the object. Accordingly, the planning component may generate an alternative trajectory relative to the object, such as stopping the vehicle before the object or traversing around the object. The planning component may work in conjunction with other components of the autonomous vehicle to determine the alternate trajectory to guide the vehicle to its intended destination. At operation 616, the planning component may control the autonomous vehicle based at least in part on the trajectory determined in operation 614. For example, the planner may engage the system controllers of the autonomous vehicle to execute the trajectory around the object.

EXAMPLE CLAUSES

A. A system comprising: one or more processors; and one or more computer-readable media storing computer-executable instructions that, when executed, cause the one or more processors to perform operations comprising: receiving, from a radar device, radar data associated with a vehicle operating in an environment; detecting, based at least in part on the radar data, an object within the environment; determining, based at least in part on radar cross-section data associated with the radar data, a variance of the radar cross-section data; determining an object classification associated with the object, based at least in part on determining that the variance is lower than or equal to a variance threshold; determining, based at least in part on the object classification, a driving path for the vehicle; and controlling the vehicle within the environment based at least in part on the driving path.

B. The system of paragraph A, the operations further comprising: determining, a second variance of the radar cross-section data, wherein the variance of the radar cross-section data is a first variance associated with a first range window of the radar data, and wherein the second variance associated with second range window of the radar data different from the first range window; and determining, based at least in part on the second variance, a second object classification associated with the object, wherein the second object classification is different from the object classification.

C. The system of paragraph B, wherein determining the driving path for the vehicle comprises: determining, based at least in part on the second object classification, an alternative driving path for the vehicle; and controlling the vehicle within the environment based at least in part on the alternative driving path.

D. The system of paragraph A, the operations further comprising: determining a confidence metric associated with the object classification, based at least in part on the variance.

E. The system of paragraph A, wherein determining the object classification comprises determining that the object is associated with at least one of: a manhole cover object classification; a storm drain cover object classification; a road expansion joint object classification; a steel roadway plate object classification; a pothole object classification; or a road safety feature object classification.

F. A method comprising: receiving, from a radar device, radar data associated with a vehicle operating in an environment; determining, based at least in part on radar cross-section data associated with the radar data, a variance of the radar cross-section data; determining, based at least in part on the variance, an object classification associated with an object represented in the radar data; determining, based at least in part on the object classification, a driving path for the vehicle; and controlling the vehicle within the environment based at least in part on the driving path.

G. The method of paragraph F, further comprising: determining a second variance of the radar cross-section data, wherein the variance of the radar cross-section data is a first variance associated with a first range window of the radar data, and wherein the second variance is associated with second range window of the radar data different from the first range window; and determining, based at least in part on the second variance, a second object classification associated with the object, wherein the second object classification is different from the object classification.

H. The method of paragraph G, wherein determining the driving path for the vehicle comprises: determining, based at least in part on the second object classification, an alternative driving path for the vehicle; and controlling the vehicle within the environment based at least in part on the alternative driving path.

I. The method of paragraph F, wherein determining the variance comprises: determining a set of radar cross-section values associated with at least one of a time window or a range window; and determining at least one of: a statistical variance on a distribution of the set of radar cross-section values; a difference between a maximum value and a minimum value in the set of radar cross-section values; or an output of a machine-learning model trained to determine the object classification based the set of radar cross-section values.

J. The method of paragraph F, wherein the radar data comprises output from a plurality of radar devices.

K. The method of paragraph F, wherein the radar data includes velocity data associated with the object, and wherein determining the object classification is further based at least in part on the velocity data associated with the object.

L. The method of paragraph F, wherein the radar data includes elevation data associated with the object, and wherein determining the object classification is further based at least in part on the elevation data associated with the object.

M. The method of paragraph F, wherein determining the object classification comprises determining that the object is associated with at least one of: a manhole cover object classification; a storm drain cover object classification; a road expansion joint object classification; a steel roadway plate object classification; a pothole object classification; or a road safety feature object classification.

N. One or more non transitory computer readable media storing instructions executable by a processor, wherein the instructions, when executed, cause the processor to perform operations comprising: receiving, from a radar device, radar data associated with a vehicle operating in an environment; determining, based at least in part on radar cross-section data associated with the radar data, a variance of the radar cross-section data; determining, based at least in part on the variance, an object classification associated with an object represented in the radar data; determining, based at least in part on the object classification, a driving path for the vehicle; and controlling the vehicle within the environment based at least in part on the driving path.

O. The one or more non transitory computer readable media of paragraph N, the operations further comprising: determining a second variance of the radar cross-section data, wherein the variance of the radar cross-section data is a first variance associated with a first range window of the radar data, and wherein the second variance is associated with second range window of the radar data different from the first range window; and determining, based at least in part on the second variance, a second object classification associated with the object, wherein the second object classification is different from the object classification.

P. The one or more non transitory computer readable media of paragraph O, wherein determining the driving path for the vehicle comprises: determining, based at least in part on the second object classification, an alternative driving path for the vehicle; and controlling the vehicle within the environment based at least in part on the alternative driving path.

Q. The one or more non transitory computer readable media of paragraph N, wherein determining a set of radar cross-section values associated with at least one of a time window or a range window; and determining at least one of: a statistical variance on a distribution of the set of radar cross-section values; a difference between a maximum value and a minimum value in the set of radar cross-section values; or an output of a machine-learning model trained to determine the object classification based the set of radar cross-section values.

R. The one or more non transitory computer readable media of paragraph N, wherein the radar data comprises output from a plurality of radar devices.

S. The one or more non transitory computer readable media of paragraph N, wherein the radar data includes velocity data associated with the object, and wherein determining the object classification is further based at least in part on the velocity data associated with the object.

T. The one or more non transitory computer readable media of paragraph N, wherein the radar data includes elevation data associated with the object, and wherein determining the object classification is further based at least in part on the elevation data associated with the object.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more computer-readable media storing computer-executable instructions that, when executed, cause the one or more processors to perform operations comprising:
   receiving, from a radar device, radar data captured at a first time, the radar data associated with a first region relative to a vehicle operating in an environment;
   determining, based at least in part on radar cross-section data associated with the radar data, a variance of the radar cross-section data;
   determining, based at least in part on determining that the variance is between a first lower variance threshold and a second higher variance threshold, that the radar data represents multiple objects having different object classifications within the first region;
   determining, based at least in part on the object classifications of the multiple objects, a driving path for the vehicle; and
   controlling the vehicle within the environment based at least in part on the driving path.

2. The system of claim 1, the operations further comprising:
   determining, a second variance of the radar cross-section data, wherein the variance of the radar cross-section data is a first variance associated with a first range window of the radar data, and wherein the second variance associated with second range window of the radar data different from the first range window; and
   determining, based at least in part on the second variance, a modified object classification associated with at least one of the multiple objects.

3. The system of claim 2, wherein determining the driving path for the vehicle comprises:
   determining, based at least in part on the modified object classification, an alternative driving path for the vehicle; and
   controlling the vehicle within the environment based at least in part on the alternative driving path.

4. The system of claim 1, the operations further comprising:
   determining a confidence metric associated with the object classifications of the multiple objects, based at least in part on the variance.

5. A method comprising:
   receiving, from a radar device, radar data captured at a first time, the radar data associated with a first region relative to a vehicle operating in an environment;
   determining, based at least in part on radar cross-section data associated with the radar data, a variance of the radar cross-section data;
   determining, based at least in part on determining that the variance is between a first lower variance threshold and a second higher variance threshold, that the radar data represents multiple objects having different object classifications within the first region;
   determining, based at least in part on the object classifications of the multiple objects, a driving path for the vehicle; and
   controlling the vehicle within the environment based at least in part on the driving path.

6. The method of claim 5, further comprising:
   determining a second variance of the radar cross-section data, wherein the variance of the radar cross-section data is a first variance associated with a first range window of the radar data, and wherein the second variance is associated with second range window of the radar data different from the first range window; and
   determining, based at least in part on the second variance, a modified object classification associated with at least one of the multiple objects.

7. The method of claim 6, wherein determining the driving path for the vehicle comprises:
   determining, based at least in part on the modified object classification, an alternative driving path for the vehicle; and
   controlling the vehicle within the environment based at least in part on the alternative driving path.

8. The method of claim 5, wherein determining the variance comprises:
   determining a set of radar cross-section values associated with at least one of a time window or a range window; and
   determining at least one of:
   a statistical variance on a distribution of the set of radar cross-section values;
   a difference between a maximum value and a minimum value in the set of radar cross-section values; or
   an output of a machine-learning model trained to determine an object classification based the set of radar cross-section values.

9. The method of claim 5, wherein the radar data comprises output from a plurality of radar devices.

10. The method of claim 5, wherein the radar data includes velocity data associated with at least one of the multiple objects, and wherein determining the object classifications of the multiple objects is further based at least in part on the velocity data.

11. The method of claim 5, wherein the radar data includes elevation data associated with at least one of the multiple objects, and wherein determining the object classifications of the multiple objects is further based at least in part on the elevation data.

12. The method of claim 5, wherein determining the object classifications of the multiple objects comprises determining that a first object of the multiple objects is associated with at least one of:
    a manhole cover object classification;
    a storm drain cover object classification;
    a road expansion joint object classification;
    a steel roadway plate object classification;
    a pothole object classification; or
    a road safety feature object classification.

13. One or more non-transitory computer-readable media storing instructions executable by a processor, wherein the instructions, when executed, cause the processor to perform operations comprising:
    receiving, from a radar device, radar data captured at a first time, the radar data associated with a first region relative to a vehicle operating in an environment;
    determining, based at least in part on radar cross-section data associated with the radar data, a variance of the radar cross-section data;
    determining, based at least in part on determining that the variance is between a first lower variance threshold and a second higher variance threshold, that the radar data represents multiple objects having different object classifications within the first region;
    determining, based at least in part on the object classifications of the multiple objects, a driving path for the vehicle; and controlling the vehicle within the environment based at least in part on the driving path.

14. The one or more non-transitory computer-readable media of claim 13, wherein determining the variance comprises:
    determining a set of radar cross-section values associated with at least one of a time window or a range window; and
    determining at least one of:
        a statistical variance on a distribution of the set of radar cross-section values;
        a difference between a maximum value and a minimum value in the set of radar cross-section values; or
        an output of a machine-learning model trained to determine an object classification based the set of radar cross-section values.

15. The one or more non-transitory computer-readable media of claim 13, wherein the radar data includes velocity data associated with at least one of the multiple objects, and wherein determining the object classifications of the multiple objects is further based at least in part on the velocity data.

16. The one or more non-transitory computer-readable media of claim 13, wherein the radar data includes elevation data associated with at least one of the multiple objects, and wherein determining the object classifications of the multiple objects is further based at least in part on the elevation data.

17. The one or more non-transitory computer-readable media of claim 13, wherein determining that the radar data represents multiple objects having different object classifications within the first region comprises:
    determining that the first region is associated with a potentially drivable road surface; and
    determining, based at least in part on the variance, that the vehicle is capable of safely driving over at least a first object of the multiple objects.

18. The one or more non-transitory computer-readable media of claim 13, wherein determining that the radar data represents multiple objects having different object classifications within the first region comprises:
    determining, based at least in part on the variance, that the multiple objects are positioned in a same vertical plane relative to the vehicle.

19. The one or more non-transitory computer-readable media of claim 13, wherein determining that the radar data represents multiple objects having different object classifications within the first region comprises:
    determining, based at least in part on the variance, that the radar data includes at least:
        a first object having a first height below a height threshold; and
        a second object having a second height above the height threshold.

20. The one or more non-transitory computer-readable media of claim 13, the operations further comprising:
    determining a radar cross-section variance threshold, based at least in part on a current driving condition of the environment,
    wherein determining that the radar data represents multiple objects having different object classifications is based at least in part on the radar cross-section variance threshold.

* * * * *